(12) United States Patent
Yang et al.

(10) Patent No.: US 12,262,378 B2
(45) Date of Patent: Mar. 25, 2025

(54) ADDITIONAL DETAILS FOR SUB-SLOT BASED TYPE-1 HYBRID AUTOMATIC REPEAT REQUEST (HARQ)-ACKNOWLEDGEMENT (ACK) CODEBOOK GENERATION

(71) Applicant: QUALCOMM Incorporated, San Diego, CA (US)

(72) Inventors: Wei Yang, San Diego, CA (US); Yi Huang, San Diego, CA (US); Konstantinos Dimou, New York City, NY (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/661,836

(22) Filed: May 3, 2022

(65) Prior Publication Data

US 2022/0361210 A1 Nov. 10, 2022

(30) Foreign Application Priority Data

May 4, 2021 (EP) .................................. 21172152

(51) Int. Cl.
*H04W 72/1273* (2023.01)
*H04L 1/1812* (2023.01)
*H04W 72/0446* (2023.01)

(52) U.S. Cl.
CPC ....... *H04W 72/1273* (2013.01); *H04L 1/1812* (2013.01); *H04W 72/0446* (2013.01)

(58) Field of Classification Search
CPC .......... H04W 72/1273; H04W 72/0446; H04L 1/1812; H04L 1/1854
See application file for complete search history.

(56) References Cited

U.S. PATENT DOCUMENTS

2019/0349941 A1 11/2019 Yang et al.
2020/0213046 A1* 7/2020 Wang .................... H04L 5/0055
(Continued)

FOREIGN PATENT DOCUMENTS

EP         3902175 A1   10/2021
WO    WO-2021033116 A1    2/2021

OTHER PUBLICATIONS

Nokia, "Support of Type-1 HARQ-ACK Codebook with PUCCH sub-slot configurations", Oct. 26-Nov. 13, 2020, 3GPP, R1-2008298 . (Year: 2020).*

(Continued)

*Primary Examiner* — Peter P Chau
(74) *Attorney, Agent, or Firm* — Norton Rose Fulbright US LLP

(57) ABSTRACT

This disclosure provides systems, methods, and devices for wireless communication that support sub-slot based Type-1 hybrid automatic repeat request (HARQ) feedback codebook generation. In aspects, techniques are provided for generating a set of candidate physical downlink shared channel (PDSCH) reception occasions for an active bandwidth part (BWP) of a downlink (DL) serving cell. In aspects, a user equipment (UE) obtains a set of UL sub-slots based, at least in part, on a set of K1 values, and then determines, for each UL sub-slot in the set of UL sub-slots, whether the UL sub-slots satisfy a predetermined overlapping condition with a current DL slot. A PDSCH reception occasions set is generated based, at least in part, on a set of time domain resource allocation (TDRA) candidates of the current DL slot and a determination that a current UL sub-slot satisfies the predetermined overlapping condition with the current DL slot.

36 Claims, 12 Drawing Sheets

(56) References Cited

U.S. PATENT DOCUMENTS

| | | | | |
|---|---|---|---|---|
| 2021/0218504 A1* | 7/2021 | Wang | ................... | H04L 1/1812 |
| 2021/0266939 A1 | 8/2021 | Takeda et al. | | |
| 2022/0124775 A1* | 4/2022 | Zhang | ................... | H04L 1/1854 |
| 2023/0239082 A1* | 7/2023 | Choi | ................ | H04W 72/1273 |
| 2023/0397183 A1* | 12/2023 | Kittichokechai | ..... | H04L 5/0092 |

OTHER PUBLICATIONS

International Search Report and Written Opinion—PCT/US2022/072106—ISA/EPO—Aug. 26, 2022.

NTT Docomo, et al., "UCI Enhancements for URLLCU", 3GPP Draft, 3GPP TSG RAN WG1 #96, R1-1902805_UCI Enhancement, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600500, 10 pages, figures 1-12, Section 2.

ZTE: "Discussion on HARQ-ACK Enhancements for eURLLC", 3GPP TSG RAN WG1 Meeting #104-e, R1-2100101, e-Meeting, Jan. 25-Feb. 5, 2021, pp. 1-14.

\* cited by examiner

ADDITIONAL DETAILS FOR SUB-SLOT BASED TYPE-1 HYBRID AUTOMATIC REPEAT REQUEST (HARQ)-ACKNOWLEDGEMENT (ACK) CODEBOOK GENERATION

CROSS-REFERENCE TO RELATED APPLICATIONS

This application claims the benefit of European Patent Application No. 21172152.7, entitled, "ADDITIONAL DETAILS FOR SUB-SLOT BASED TYPE-1 HYBRID AUTOMATIC REPEAT REQUEST (HARD)-ACKNOWLEDGEMENT (ACK) CODEBOOK GENERATION," filed on May 4, 2021, which is expressly incorporated by reference herein in its entirety.

BACKGROUND

Field

Aspects of the present disclosure relate generally to wireless communication systems, and more particularly, to hybrid automatic repeat request (HARD) feedback codebook generation.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or nodeBs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications. It is desirable to provide mechanisms to support a more robust set functionality to handle the increasing needs and complexities of wireless communication systems. For example, aspects of the present disclosure provide a mechanism to support sub-slot based Type-1 HARQ feedback codebook generation, which enable a system to provide improved services, as discussed in the present disclosure.

SUMMARY

Various aspects of the present disclosure are directed to systems and methods for supporting sub-slot based Type-1 HARQ feedback codebook generation. In aspects, techniques are provided for constructing and/or generating a set of candidate PDSCH reception occasions for an active bandwidth part (BWP) of a DL serving cell that may be used for generating a HARQ feedback codebook.

The techniques described in aspects of the present disclosure may address problems with current approaches for HARQ feedback codebook generation, as will be described in more detail below. In particular, the techniques herein address the problems that arise when mixed numerology and arbitrary UL sub-slot configuration is used, such as when an uplink slot length is not a multiple of downlink slots, or a downlink slot length is not a multiple of uplink slots, as in the case when there is a partial overlapping between uplink and downlink slots (e.g., when an uplink slot is not fully contained within a single downlink slot, or when a downlink slot is not fully contained within a single uplink slot). In addition, the techniques described herein may also address problems that arise in HARQ feedback codebook generation in current implementations that check whether the condition of a k1 value satisfy $\mod(n_y-k1+1, N_{UL}^{DL})=0$ and may not allow a UE to transmit HARQ feedback in every slot, thereby incurring unnecessary latency. Additionally, the techniques described herein may also address problems that arise in current approaches that incur a large redundancy when the uplink slots are not aligned with downlink slots, as in this case a UE may insert dummy uplink slots to align with a downlink slot.

In one aspect of the disclosure, a method of wireless communication includes determining, by a user equipment (UE), to generate a feedback codebook to be transmitted to a base station in a feedback uplink (UL) sub-slot of a plurality of UL sub-slots of an UL slot, obtaining a set of UL sub-slots based, at least in part, on the feedback UL sub-slot and a set of K1 values, each UL sub-slot in the set of UL sub-slots associated with a different K1 value of the set of K1 values, determining, for each UL sub-slot in the set of UL sub-slots, whether a current UL sub-slot in the set of UL sub-slots satisfies a predetermined overlapping condition with a current downlink (DL) slot, the current DL slot configured with a set of time domain resource allocation (TDRA) candidates, generating a set of physical downlink shared channel (PDSCH) reception occasions based, at least in part, on the set of TDRA candidates of the current DL slot and a determination that the current UL sub-slot satisfies the predetermined overlapping condition with the current DL slot, and constructing the feedback codebook based on the set of PDSCH reception occasions.

In an additional aspect of the disclosure, an apparatus includes at least one processor and a memory coupled to the at least one processor. The memory stores processor-readable code that, when executed by the at least one processor, is configured to perform operations including determining, by a UE, to generate a feedback codebook to be transmitted to a base station in a feedback UL sub-slot of a plurality of UL sub-slots of an UL slot, obtaining a set of UL sub-slots based, at least in part, on the feedback UL sub-slot and a set of K1 values, each UL sub-slot in the set of UL sub-slots associated with a different K1 value of the set of K1 values, determining, for each UL sub-slot in the set of UL sub-slots, whether a current UL sub-slot in the set of UL sub-slots satisfies a predetermined overlapping condition with a current DL slot, the current DL slot configured with a set of TDRA candidates, generating a set of PDSCH reception occasions based, at least in part, on the set of TDRA candidates of the current DL slot when the current UL sub-slot satisfies the predetermined overlapping condition with the current DL slot, and constructing the feedback codebook based on the set of PDSCH reception occasions.

In an additional aspect of the disclosure, a non-transitory computer-readable medium stores instructions that, when executed by a processor, cause the processor to perform operations. The operations include determining, by a UE, to generate a feedback codebook to be transmitted to a base station in a feedback UL sub-slot of a plurality of UL sub-slots of an UL slot, obtaining a set of UL sub-slots based, at least in part, on the feedback UL sub-slot and a set of K1 values, each UL sub-slot in the set of UL sub-slots associated with a different K1 value of the set of K1 values, determining, for each UL sub-slot in the set of UL sub-slots, whether a current UL sub-slot in the set of UL sub-slots satisfies a predetermined overlapping condition with a current DL slot, the current DL slot configured with a set of TDRA candidates, generating a set of PDSCH reception occasions based, at least in part, on the set of TDRA candidates of the current DL slot and a determination that the current UL sub-slot satisfies the predetermined overlapping condition with the current DL slot, and constructing the feedback codebook based on the set of PDSCH reception occasions.

In an additional aspect of the disclosure, an apparatus includes means for determining, by a UE, to generate a feedback codebook to be transmitted to a base station in a feedback UL sub-slot of a plurality of UL sub-slots of an UL slot, means for obtaining a set of UL sub-slots based, at least in part, on the feedback UL sub-slot and a set of K1 values, each UL sub-slot in the set of UL sub-slots associated with a different K1 value of the set of K1 values, means for determining, for each UL sub-slot in the set of UL sub-slots, whether a current UL sub-slot in the set of UL sub-slots satisfies a predetermined overlapping condition with a current DL slot, the current DL slot configured with a set of TDRA candidates, means for generating a set of PDSCH reception occasions based, at least in part, on the set of TDRA candidates of the current DL slot and a determination that the current UL sub-slot satisfies the predetermined overlapping condition with the current DL slot, and means for constructing the feedback codebook based on the set of PDSCH reception occasions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized, by way of example only, with reference to the following drawings. In the appended figures, similar components or features may have the same reference label. Further, various components of the same type may be distinguished by following the reference label by a second label, with or without an intervening dash, that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
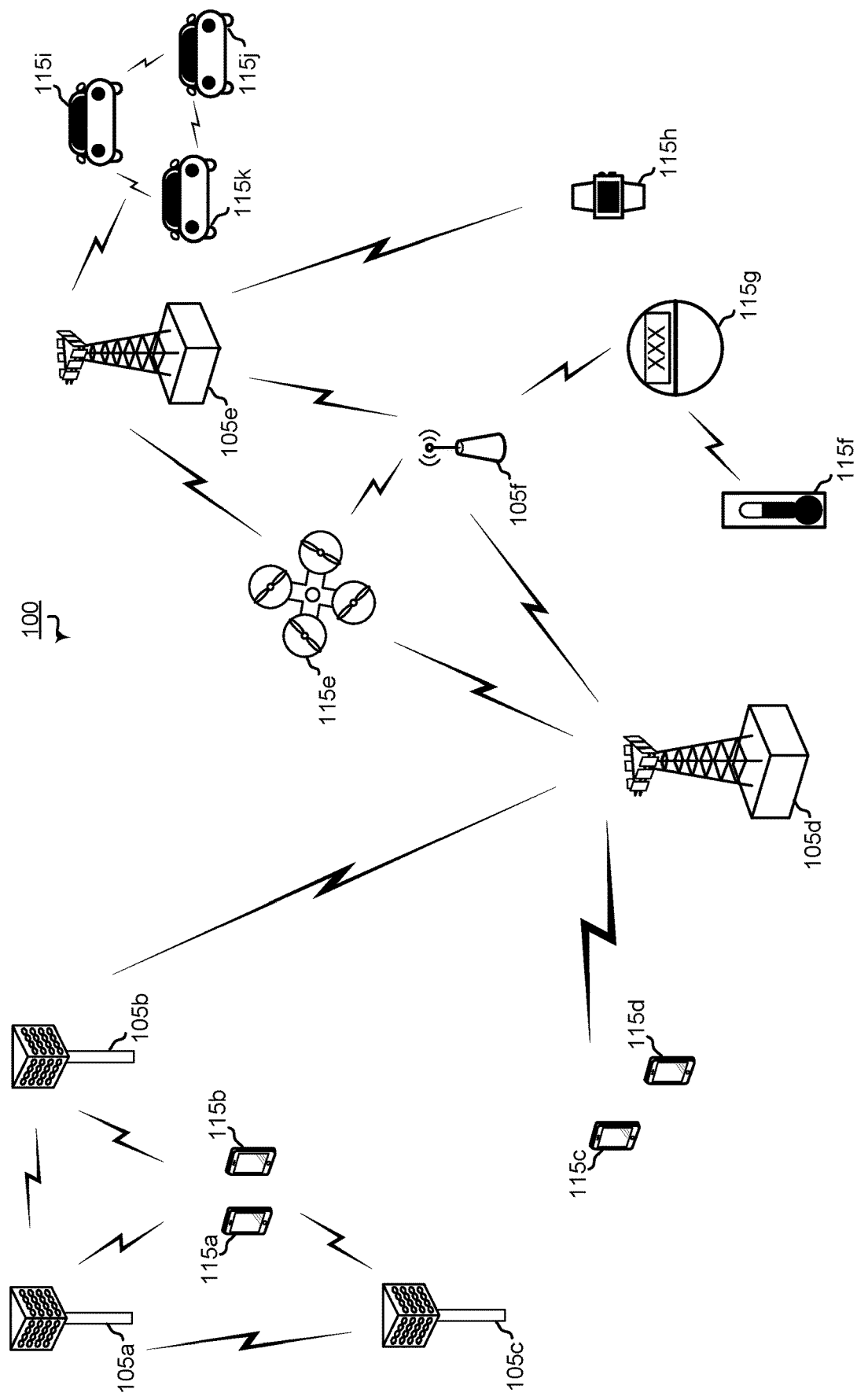
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that initially aimed to define a globally applicable third generation (3G) mobile phone specification. 3GPP long term evolution (LTE) is a 3GPP project which is aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., 1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5GNR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports sub-slot based Type-1 HARQ feedback codebook generation in accordance with aspects of the present disclosure. The wireless communications system 100 includes base stations 105, UEs 115, and a core network. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Wireless network 100 illustrated in FIG. 1 includes a number of base stations 105 and other network entities. Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

As used herein, a network entity may be or may include a base station and/or functionality of a base station. In aspects a network entity, network node, network equipment, mobility element of wireless network 100, etc., may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (MC), or a Non-Real Time (Non-RT) MC, etc.

Each base station 105 may be associated with a particular geographic coverage area in which communications with various UEs 115 is supported. Each base station 105 may provide communication coverage for a respective geographic coverage area via communication links, and communication links between a base station 105 and a UE 115 may utilize one or more carriers. Communication links in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area for a base station 105 may be divided into sectors making up a portion of the geographic coverage area, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area. In some examples, different geographic coverage areas associated with different technologies may overlap, and overlapping geographic coverage areas associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a-d), a personal digital assistant (PDA), a wearable device (UE 115h), a tablet computer, a laptop computer, or a personal computer. In some examples, a UE 115 may also refer to a wireless local loop (WLL) station, an Internet-of-things (IoT) device (115g), an Internet-of-everything (IoE) device, an MTC device, or the like, which may be implemented in various articles such as appliances, vehicles (UE 115e and UE 115i-k), meters (UE 115f), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area of a base station 105. Other UEs 115 in such a group may be outside the geographic coverage area of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network and with one another. For example, base stations 105 may interface with the core network through backhaul links (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network).

The core network may provide user authentication, access authorization, tracking, Internet Protocol (IP) connectivity, and other access, routing, or mobility functions. The core network may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum.

For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, 16-μs or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link. For example, a carrier of a communication link may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-NRF carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
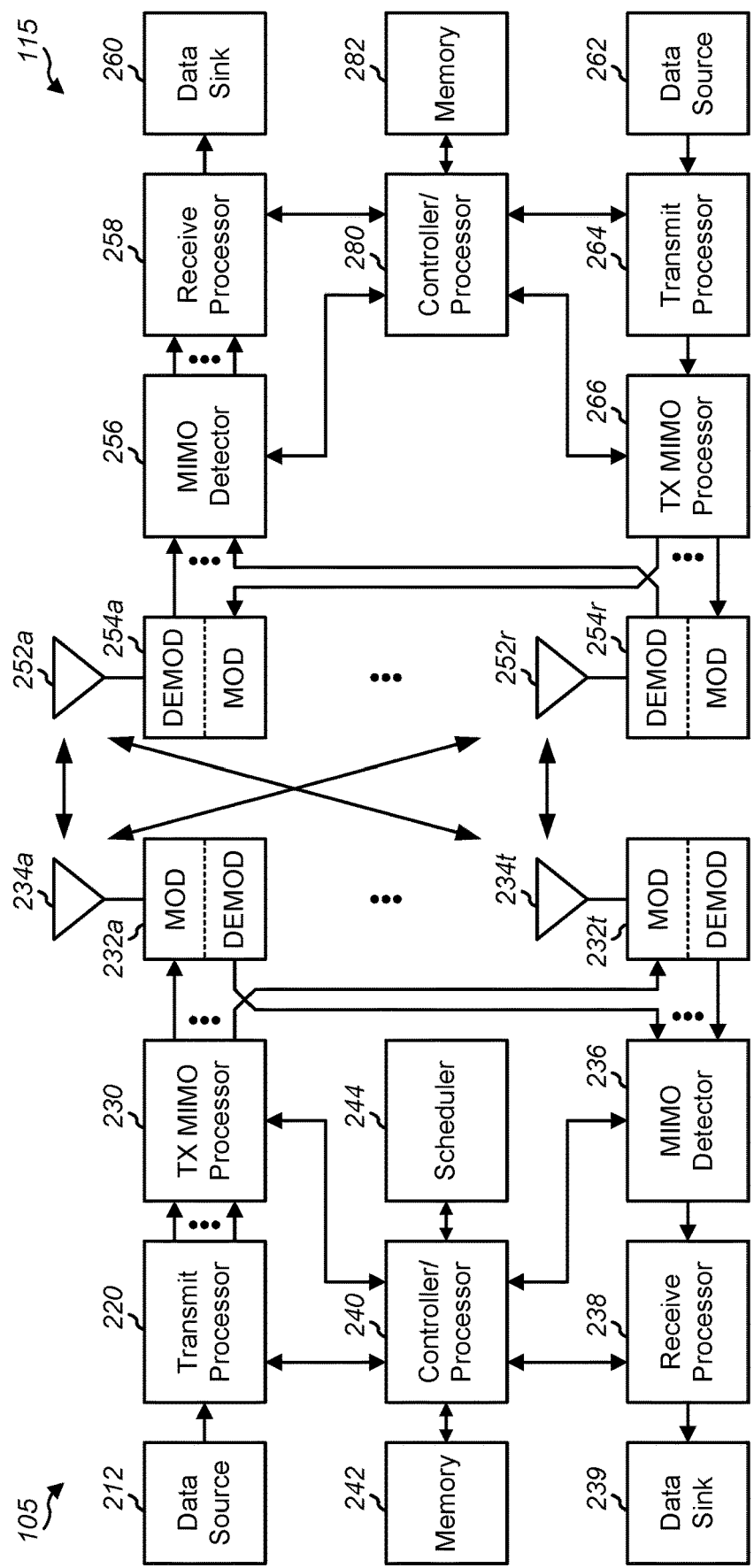
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 1-8 and/or other processes for the techniques described herein. The memories 242 and 282 may store data and program codes for the base station 105 and the UE 115, respectively. A scheduler 244 may schedule UEs for data transmission on the downlink and/or uplink.

In current wireless communication systems, a user equipment (UE) may be configured to provide feedback (e.g., hybrid automatic repeat request (HARQ) feedback (e.g., acknowledgement (ACK)/non-ACK (HACK))) for a PDSCH transmission in a particular feedback resource of a PUCCH. In some implementations, the UE may be configured (e.g., by downlink control message) to provide HARQ feedback for multiple PDSCH transmissions in the same PUCCH HARQ resource. In this case, the UE may multiplex the HARQ feedback bits corresponding to the multiple PDSCH transmissions into a single transmission. This multiplexing is referred as HARQ feedback codebook (CB) generation. In these cases, a HARQ feedback CB may be generated that includes the multiplexed bits representing the HARQ feedback for the multiple PDSCH transmissions. The size of the HARQ feedback CB may be based on the number of bits (e.g., the number of HARQ feedback bits each associated with a HARQ feedback for a respective PDSCH transmission) included in the HARQ feedback CB.

In implementations, generating and/or constructing a HARQ-ACK CB may be performed using one of two types of methods. A Type 1 CB generation (also known as a semi-static CB generation) may include a HARQ-ACK CB being generated based on semi-static information (e.g., information configured via radio resource control (RRC)). In a Type 2 CB generation (also known as dynamic CB generation), the HARQ-ACK CB may be constructed based on indications in a downlink control information (DCI) message (e.g., may be based on a downlink assignment index (DAI) in the DCI).

In some implementations, HARQ feedback may be slot-based, in which there may be a single PUCCH transmission within a slot that may carry HARQ feedback. In these implementations, if multiple HARQ feedback bits are to be transmitted within a slot, these HARQ feedback bits are multiplexed and transmitted in the single PUCCH transmission. However, this may cause latency issues as there is no mechanism for scheduling retransmissions within a slot, as a single feedback transmission is available.

In other implementations, sub-slot based HARQ feedback reporting is supported for low latency communications. In these implementations, a regular slot (e.g., a slot with typically 14 OFDM symbols) may be split into multiple sub-slots (e.g., of varying sizes), and a UE may transmit a HARQ-ACK transmission within each of the multiple sub-slots, thereby being configured to transmit multiple HARQ feedback transmissions within a slot. In these implementations, a UE may be configured for sub-slot based HARQ feedback reporting via a sub-slot length parameter (e.g., a subslotLengthForPUCCH parameter), which may specify the length of a sub-slot within a slot, and may typically specify a two-symbol or seven-symbol sub-slot length for normal cyclic prefix (CP) configurations, and/or a two-symbol or six-symbol sub-slot length for extended CP configurations.

In some current implementations, only Type-2 HARQ-ACK CB generation is supported. Type 1 HARQ-ACK CB generation has been proposed to be supported in future implementations of wireless communication systems. Current proposals for implementing HARQ-ACK CB generation include supporting Type-1 HARQ-ACK codebook for sub-slot based PUCCH configuration. In consideration, it is noted that the properties of the Type-1 HARQ-ACK codebook for sub-slot PUCCH at least include that a PDSCH time domain resource allocation (TDRA) be associated with an uplink (UL) (e.g., PUCCH) sub-slot if the end of the PDSCH overlaps with the associated sub-slot determined by a k1 value in a set of sub-slot timing values K1. However, there are currently no mechanisms for determining whether to group PDSCH TDRA per DL slot or per sub-slot. It is noted that, in aspects, the set of K1 values may be configured to the UE (e.g., by a network entity via a control message, such as in an uplink transmission grant) and may be used by the UE to determine a resource (e.g., an uplink resource) for providing ACK/NACK feedback associated with the uplink transmission grant.

Figure 3A:
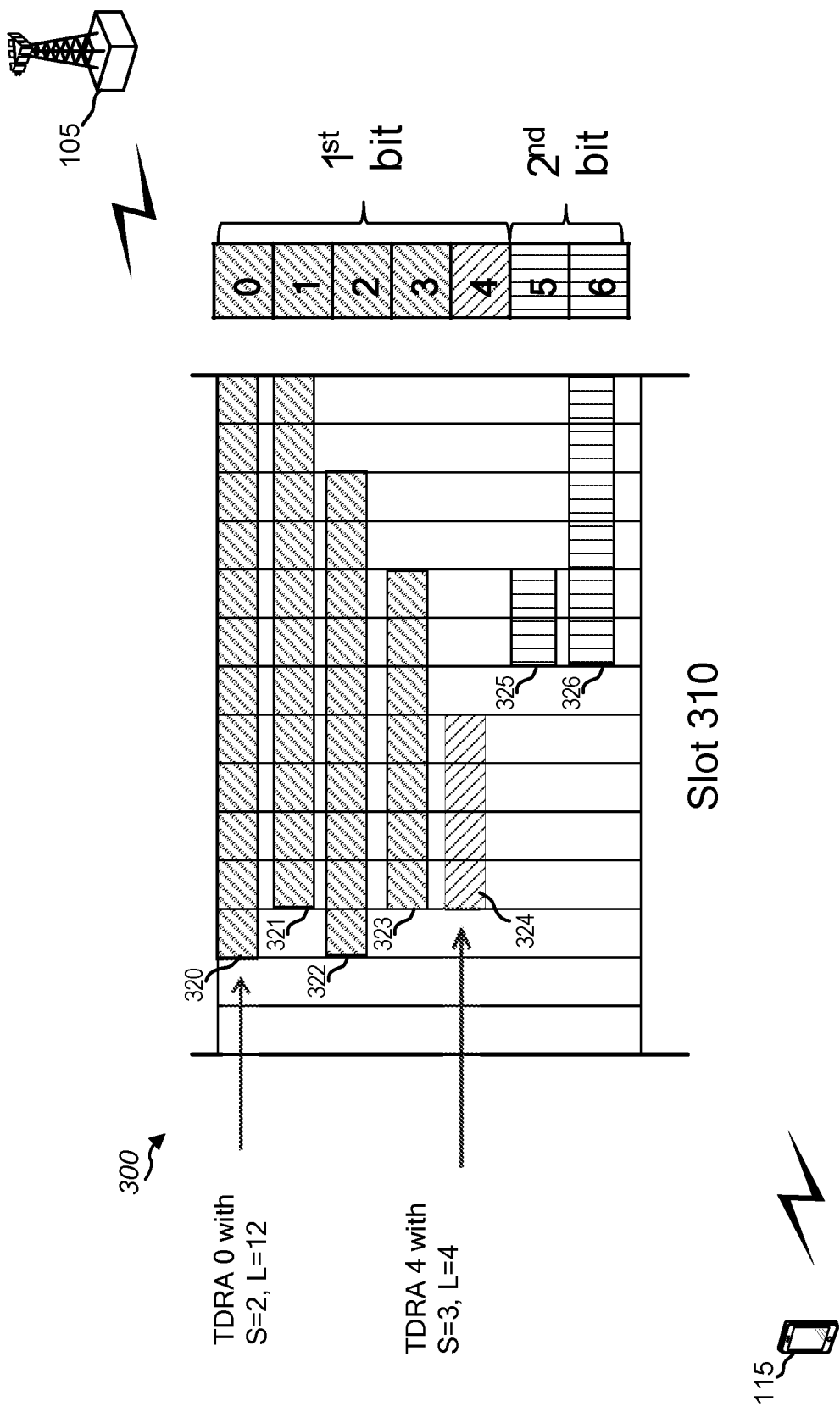
FIG. 3A is a diagram illustrating an example of slot configuration supporting type 1 hybrid automatic repeat request (HARQ) feedback codebook (CB) generation.
Figure 3B:
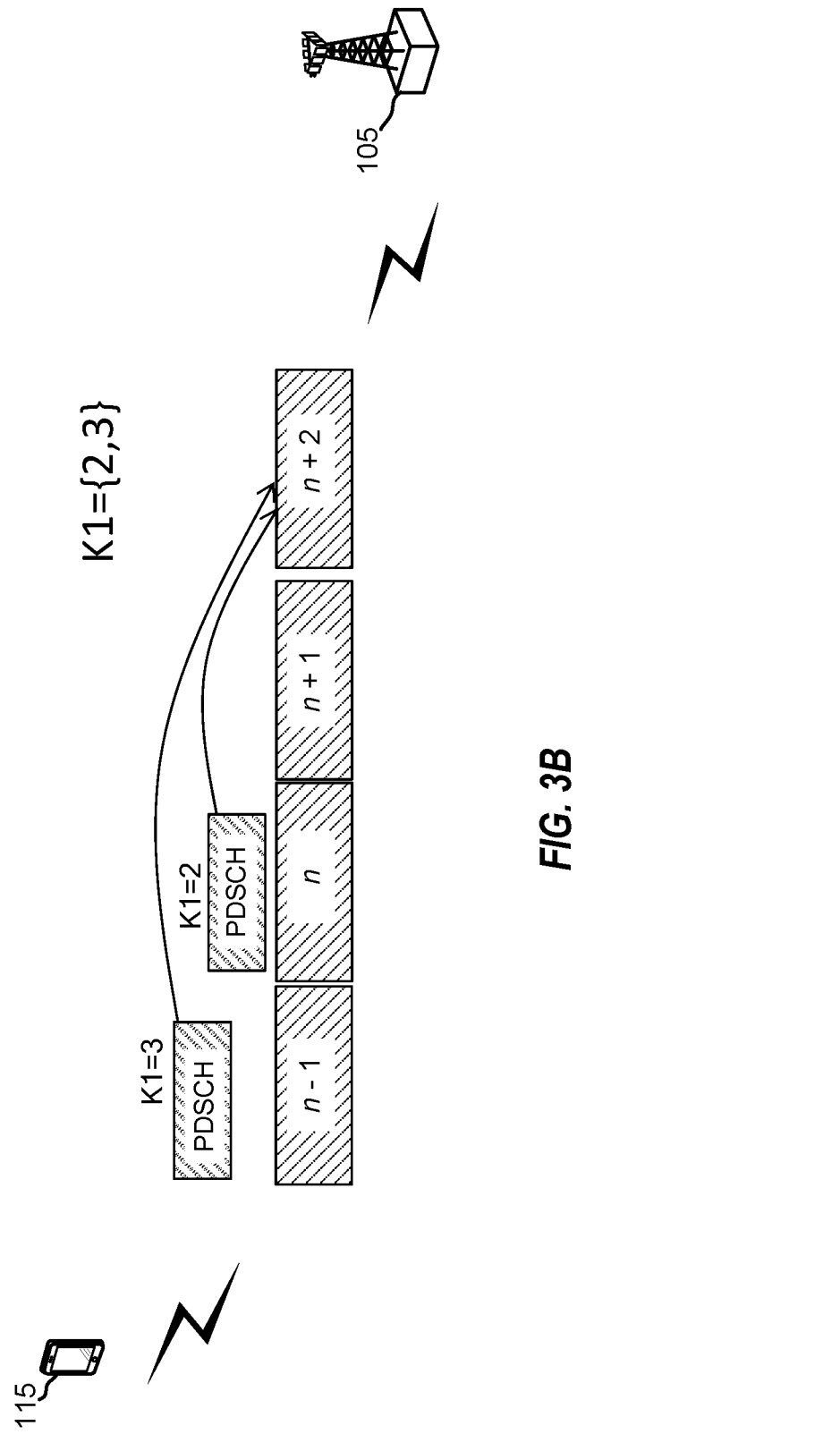
FIG. 3B is a diagram illustrating an example of a Type 1 HARQ feedback CB generation.

FIGS. 3A and 3B are diagrams illustrating an example of a type 1 HARQ feedback codebook generation. In particular, FIG. 3A is a diagram illustrating an example of slot configuration 300 supporting type 1 HARQ feedback codebook generation. UE 115 may be configured (e.g., via RRC), for each slot, with a set of parameters specifying a configuration for the slot, including one or more TDRAs for the slot. A TDRA represents a potential allocation in which a base station (e.g., base station 105) may schedule and/or transmit a PDSCH to UE 115. For example, slot 310 may be configured with seven TDRAs 320-326. Each TDRA may be defined by a starting symbol S, and a length L. For example, TDRA 320 of length 12 symbols may be configured to start at symbol 2 of slot 310, while TDRA 324 of length 4 symbols may be configured to start at symbol 3 of slot 310. Base station 105 may schedule a PDSCH transmission to be received by UE 115 in any of TDRAs 320-326. In aspects, base station 105 may transmit at least one PDSCH to UE 115 by dynamically indicating (e.g., via a DCI in a transmission grant) the TDRAs in which base station 105 is to transmit a PDSCH, and UE 115 may receive the PDSCH transmission in the indicated TDRAs.

In some implementations, a PDSCH transmission may not overlap with another PDSCH transmission within the same slot. Therefore, base station 105 may transmit multiple PDSCH transmissions in TDRAs that do not overlap with each other (and/or with another TDRA). In this manner, the number of PDSCH reception occasions within a slot (e.g., the number PDSCH transmission that may be scheduled within a slot) may be less than the number of TDRAs configured for a slot. For example, in slot 310, at most two non-overlapping PDSCH transmissions may be scheduled. As can be seen, TDRA 324 and TDRA 325 are non-overlapping, and TDRA 324 and TDRA 326 are also non-overlapping. As such, within the configuration of slot 310 of UE 115, base station 105 may transmit at most two non-overlapping PDSCH transmissions, a PDSCH in TDRA 324 and another PDSCH in TDRA 325, or a PDSCH in TDRA 324 and another PDSCH in TDRA 326. Any other PDSCH transmission within slot 310 may overlap with another PDSCH transmission and thus may not be allowed.

In implementations, generating a Type 1 HARQ feedback CB may involve enumerating all TDRAs configured within a slot, determining a number of PDSCH transmissions that may be scheduled within the slot based on the TDRAs (e.g., the number of non-overlapping PDSCH reception occasions within a slot), and then generating an amount of HARQ feedback bits based on the number of non-overlapping PDSCH reception occasions. UE 115 may then assign the different HARQ feedback bits to the non-overlapping TDRAs. For example, UE 115 may determine, after enumerating TDRAs 320-326, that at most there are two non-overlapping PDSCH reception occasions available within slot 310 (e.g., in TDRA 324 and TDRA 325, or in TDRA 324 and TDRA 326). UE 115 may generate two HARQ-feedback bits. Base station 105 may then map each of TDRA 324 and TDRA 325, or each of TDRA 324 and TDRA 326, to a corresponding HARQ feedback bit. For example, TDRA 324 may be mapped to the first bit, and either TDRA 325 or TDRA 326 may be mapped to the second bit.

It is noted that TDRA pruning may also be referred to as TDRA grouping. In implementations, TDRA pruning may include grouping subsets of the TDRAs into groups and then mapping the groups to a HARQ feedback bit. For example, as shown in FIG. 3A, TDRAs 320-324 may be grouped together and mapped to the first bit, and TDRA 325 and TDRA 326 may be grouped together and mapped to the second bit. Generally, the TDRAs within a group may be overlapping TDRAs. In these cases, at most one TDRA from the subset may be used at a given time to schedule a PDSCH from the base station. In the standard specifications defining operations of current wireless communication systems (e.g., 3GPP specifications), pseudo code may be defined to determine the number of bits, and to map each TDRA candidate to a HARQ-ACK bit, as described above.

It is also noted that the above procedure may also be referred to as TDRA pruning, as the set of configured TDRAs in a slot is pruned to determine the maximum number of non-overlapping PDSCH reception occasions within a slot.

It is further noted that with FIGS. 3A and 3B, and throughout the current disclosure, the examples described may specify that one HARQ feedback bit may be generated for each PDSCH occasion without loss of generality. However, it will be appreciated that the techniques described herein may be equally applicable to other scenarios in which a UE may generate more than one HARQ feedback bit per PDSCH occasion. In particular, in another example, the number of HARQ feedback bits may be twice the number of PDSCH occasions when, for each PDSCH occasion, a PDSCH occasion is configured to have at most two transport blocks (TBs), and the UE may feedback one bit per TB in a PDSCH occasion. In another example implementing code-block group (CBG), the number of HARQ feedback bits may be M times the number of PDSCH occasions, where M is the configured CBG size. In these examples, the UE may feedback M bits (for the M configured CBGs) for each PDSCH occasion.

The next steps in the Type 1 HARQ feedback CB generation may include determining a number of, and which, HARQ feedback bits are to be multiplexed within the HARQ feedback to be transmitted to base station 105. As noted above, within slot 310, at most, two HARQ feedback bits may be generated. However, the HARQ feedback CB may include the HARQ feedback bits from slot 310, as well as HARQ feedback bits from other slots. FIG. 3B is a diagram illustrating an example of a Type 1 HARQ feedback CB generation. In particular, when determining the size of the HARQ feedback CB to be transmitted to base station 105 in a HARQ feedback slot, UE 115 may be configured to determine the slots in which a PDSCH for which a HARQ feedback is to be transmitted in the HARQ feedback slot, and then to multiplex the HARQ feedback for the various PDSCH transmissions in the determined slots. For example, when configuring UE 115 to receive a PDSCH transmission (e.g., in a DCI) within a slot, base station 105 may specify a k1 value that is to be used for determining a slot in which HARQ feedback for the PDSCH transmission is to be transmitted to base station 105. In aspects, the k1 values may be semi-statically configured, and UE 115 may be configured with a K1 set of k1 values, and base station 105 may indicate (e.g., via the DCI message) which k1 value from the K1 set UE 115 is to use to transmit a HARQ feedback for a PDSCH. For example, base station 105 may schedule to transmit a PDSCH in slot n−1, and may indicate a k1=3. In this case, UE 115 may transmit a HARQ feedback for the PDSCH transmission received in slot n−1 in slot (n−1)+3=n+2.

Based on the foregoing, UE 115 may be configured to consider all values in the K1 set when determining for which slots to include HARQ feedback in the HARQ feedback CB. For example, a K1 set in the example illustrated in FIG. 3B may include K1={2,3}. In this case, UE 115 may be configured to determine to transmit a Type 1 HARQ feedback CB in slot n+2. UE 115 may construct the Type 1 HARQ feedback CB by determining slots for which to include HARQ feedback in the HARQ feedback CB. In this case, UE 115 may "look back" from slot n+2 to slots based on the K1 set. For example, UE 115 may look back to slot (n+2)−2=n, and may perform the above procedures (e.g., the TDRA pruning procedure) to determine a number of HARQ feedback bits for slot n. In this manner, UE 115 may determine the maximum number of HARQ feedback bits that may be added for slot n to the HARQ feedback CB to be transmitted in slot n+2. UE 115 may also look back to slot (n+2)−3=n−1, and may perform the above procedures (e.g., the TDRA pruning procedure) to determine a number of HARQ feedback bits for slot n−1. In this manner, UE 115 may determine the maximum number of HARQ feedback bits that may be added for slot n−1 to the HARQ feedback CB to be transmitted in slot n+2. UE 115 may perform this process for all values in the K1 set and in this manner may determine a size of a semi-static Type 1 HARQ feedback CB to be transmitted in slot n+2. UE 115 may multiplex the HARQ feedback bits from the various slots into the HARQ feedback CB.

It should be noted from the above, that the size of a semi-static HARQ feedback CB may depend on two parameters, namely the set of TDRAs candidates (which may determine the number of HARQ feedback bits for a given slot) and the set of K1 values (which may determine which slot's HARQ feedback may be multiplexed into the HARQ feedback CB).

In some cases, Type 1 HARQ feedback CB generation is a straightforward procedure, especially when the DL and uplink (UL) have the same numerology and/or subcarrier spacing (SCS) (e.g., when the same slot-length is used for the DL slots and UL slots). In this case, when UE 115 looks back (e.g., based on the K1 set of values) to determine for which slots the HARQ feedback is to be multiplexed into the HARQ feedback CB, the look back is based on a number of UL slots. For example, with reference to FIG. 3B, when UE 115 looks back from slot n+2, UE 115 looks back 2 and 3 uplink slot lengths (based on K1={2,3}) to DL slots n and n−1, respectively. This is because the length of a DL and UL slot is the same. UE 115 may then perform TDRA pruning on DL slots n and n−1 to determine a size of the HARQ feedback CB.

Figure 4:
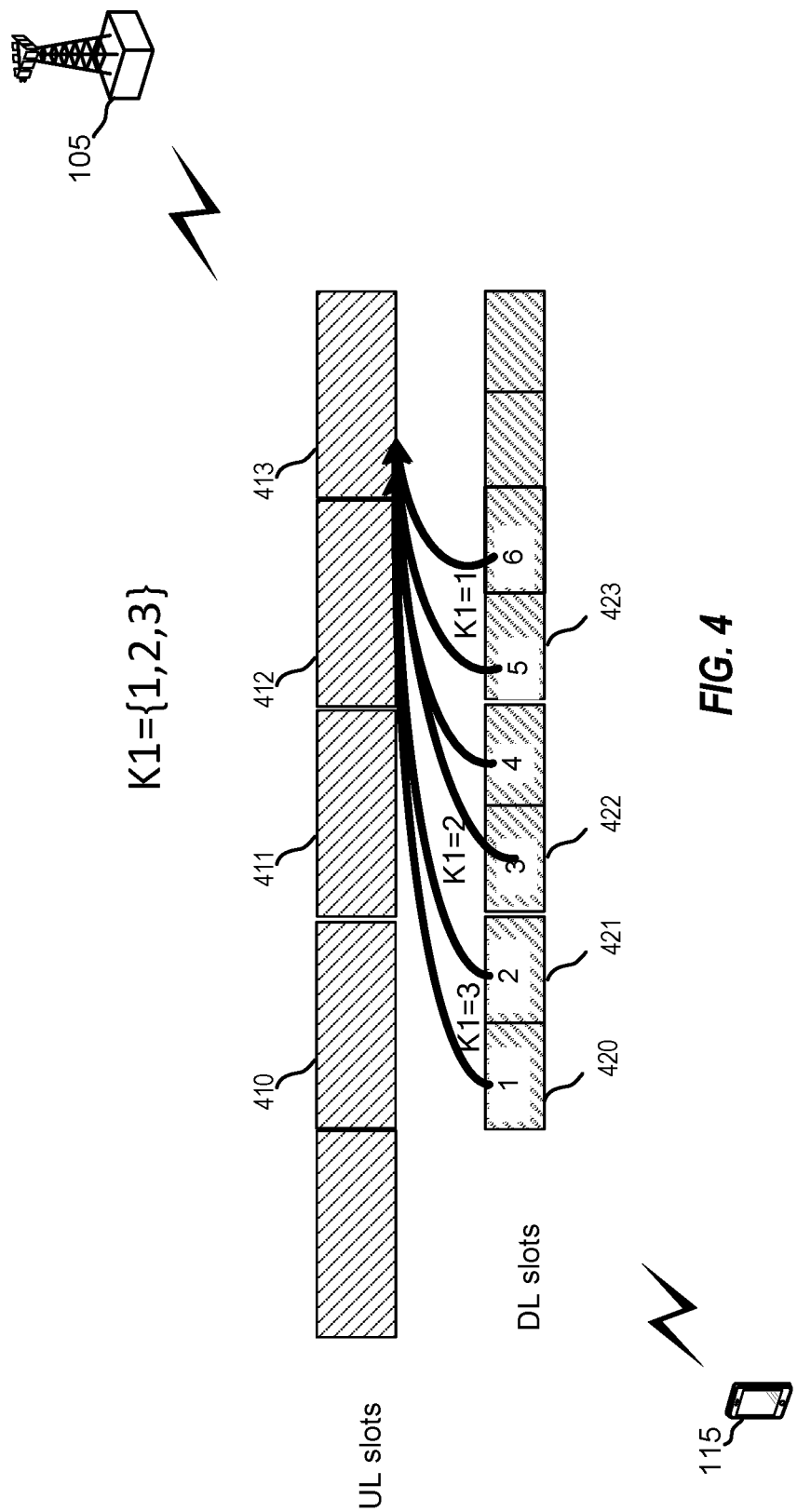
FIG. 4 is a diagram illustrating an example of a configuration in which an uplink (UL) slot is longer than a downlink (DL) slot.

However, when the DL SCS is greater than the UL SCS, then one UL slot may contain more than one DL slot (e.g., the duration of one UL slot may overlap, or include, the duration of more than one DL slot), as the UL slots may have longer lengths. FIG. 4 is a diagram illustrating an example of a configuration in which a UL slot is longer than a downlink slot. In particular, as shown, each UL slot has a length that overlaps the length of more than one DL slot. For example, UL slot 410 may overlap downlink slots 420 and 421, UL slot 411 may overlap downlink slots 422 and downlink slot 4, and UL slot 413 may overlap downlink slots 423 and downlink slot 6. In this case, for a HARQ feedback CB to be transmitted in slot 413, UE 115 may enumerate UL slots determined based on the set of K1 values (which in this example is K1={1,2,3} to enumerate UL slot 410 (e.g., based on k1=3), UL slot 411 (e.g., based on k1=2), and UL slot 412 (e.g., based on k1=1). For each enumerated UL slot, UE 115 may determine to perform TDRA pruning on the corresponding DL slots (e.g., the slots contained within the UL slot) to determine the number of HARQ feedback bits for each of the DL slots. For example, for k1=3, UE 115 may determine to enumerate UL slot 410. UE 115 may then perform TDRA pruning on DL slots 420 and 421. The same procedure may be applied for all enumerated UL slots and corresponding DL slots.

Figure 5:
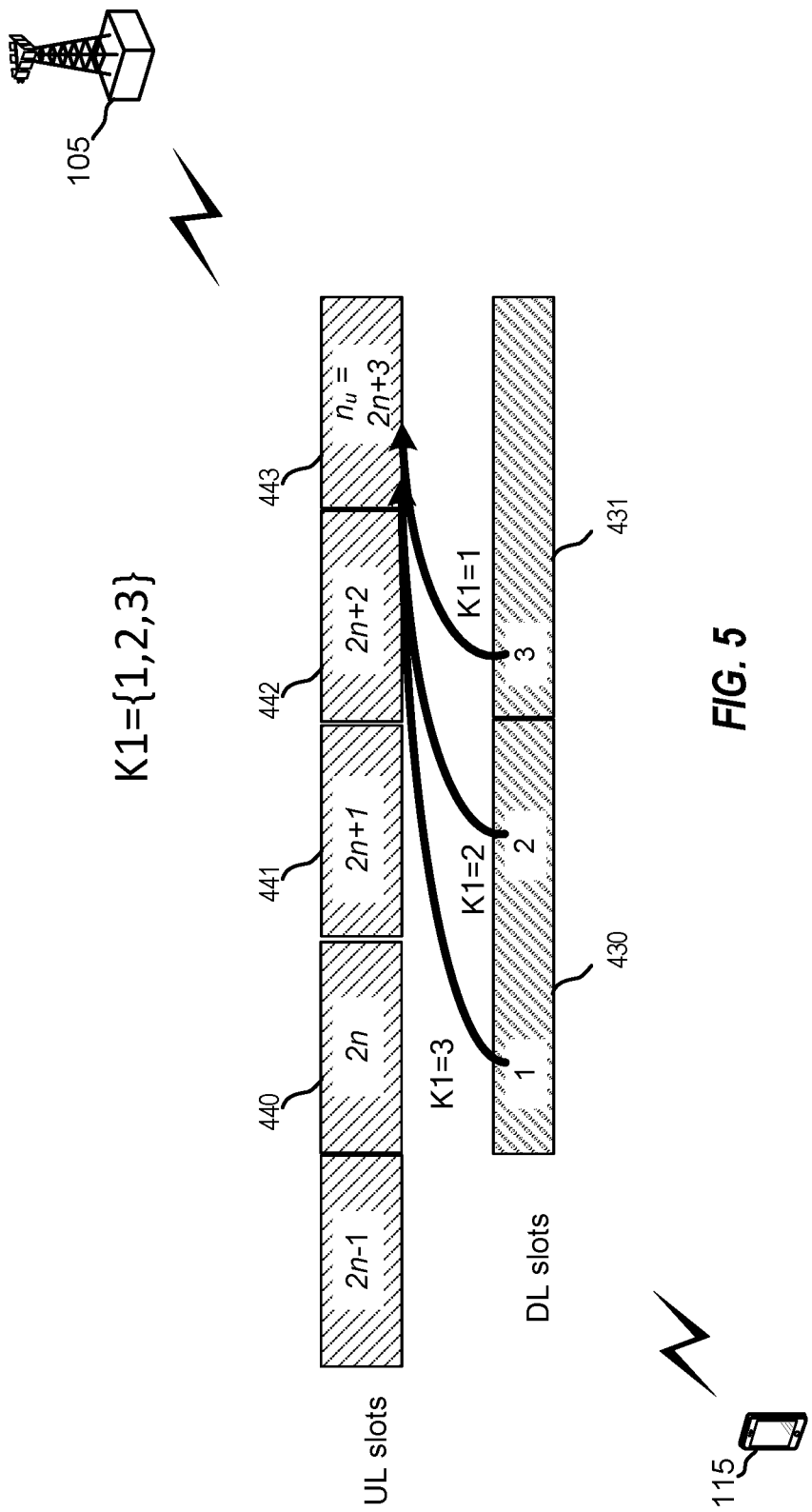
FIG. 5 is a diagram illustrating an example of a configuration in which a DL slot is longer than an UL slot.

When the DL SCS is less than the UL SCS, then one DL slot may contain more than one UL slot (e.g., the duration of one DL slot may overlap, or include, the duration of more than one UL slot), as the DL slots may have longer lengths. FIG. 5 is a diagram illustrating an example of a configuration in which a DL slot is longer than an UL slot. In particular, as shown, each DL slot 430 and 431 may have a length that overlaps the length of more than one UL slot. For example, DL slot 430 may overlap UL slots 440 and 441, and DL slot 431 may overlap UL slots 442 and 443. In this case, for a HARQ feedback CB to be transmitted in slot 443, determining which UL slots may be enumerated and which DL slots may be TDRA pruned may include applying a special rule. In some implementations, the special rule may specify that the TDRA pruning procedure described above may be performed on a subset of the UL slots determined by the set K1 of k1 values. This special rule is described in the following.

Under the special rule, the k1 value is applied always in terms of number of UL slots. In this case, the UL numerology is followed. For example, for K1={1,2,3}, UE 115 may enumerate UL slot 440 (e.g., based on k1=3), UL slot 441 (e.g., based on k1=2), and UL slot 442 (e.g., based on k1=1). In these cases, for a HARQ feedback CB to be reported in a PUCCH in UL slot $n_U$ (e.g., slot 443), UE 115 may perform TDRA pruning on DL slots corresponding to (e.g., including or overlapping) enumerated UL slots $n_U-k_1$, with k1 values that satisfy the condition $mod(n_v-k1+1, N_{UL}^{DL})=0$, where $N_{UL}^{DL}$ represents the number of UL slots in a DL slot (e.g., 2 in the example shown in FIG. 5). In this case, conditioning the performance of the TDRA pruning procedure on the above condition may facilitate avoiding double-counting PDSCH reception occasion candidates in a DL slot. For example, PDSCH occasions may be determined every other UL slot when one DL slot=two UL slots (as in the example shown FIG. 5), or PDSCH occasions may be determined every fourth UL slot when one DL slot=four UL slots, etc. When the condition above is satisfied, UE 115 may perform TDRA pruning within the corresponding DL slot of the UL slot.

In the example shown in FIG. 5, with K1={1,2,3}, and with PUCCH carrying the HARQ feedback CB being transmitted in UL slot 2n+3, UE 115 may perform TDRA pruning on the DL slot corresponding to UL slot 441 (e.g., UL slot 2n+1), namely DL slot 430. It is noted that TDRA pruning is performed per DL slot.

Although current approaches support a case in which a UL slot length is not equal to the DL slot length, this current support is limited to the case in which either one UL slot is a multiple of DL slots, or one DL slot is a multiple of UL slots. However, there is currently no mechanism to support the case in which there is a partial overlapping between UL and DL slots (e.g., when a UL slot is not fully contained within a single DL slot, or when a DL slot is not fully contained within a single UL slot). In addition, current implementations that check whether the condition of a k1 value satisfy $mod(n_v-k1+1, N_{UL}^{DL})=0$ may not allow a UE to transmit HARQ feedback in every slot, thereby incurring unnecessary latency. Furthermore, the current approach has a large redundancy when the UL slots are not aligned with DL slots (e.g., when DL slot is longer than UL slot and a UL slot is not contained completely within a DL slot). In this case, the UE may insert dummy UL slots to align with a DL slot.

Various aspects of the present disclosure are directed to systems and methods for supporting sub-slot based Type-1 HARQ feedback codebook generation. In aspects, techniques are provided for constructing and/or generating a set of candidate PDSCH reception occasions for an active bandwidth part (BWP) of a DL serving cell that may be used for generating a HARQ feedback CB, and which may address the problems with the current approaches mentioned above, and which may be effective for both mixed numerology and arbitrary UL sub-slot configuration.

In particular aspects, a UE determines to generate a HARQ feedback CB to be transmitted to a base station in a particular UL sub-slot of a plurality of UL sub-slots of an UL slot. In aspects, the UE obtains a set of UL sub-slots based, at least in part, on the feedback UL sub-slot and a set of K1 values. In these aspects, each UL sub-slot in the set of UL sub-slots corresponds to a different k1 value of the set of K1 values. The UE then iterates, or loop, through the k1 values of the set of K1 values, e.g., in descending order or ascending order, to determine whether each UL sub-slot in the set of UL sub-NRF slots overlaps with a DL slot. In aspects, the UE also iterates through all DL slots that overlap any of the UL sub-slots in the set of UL sub-slots. For example, for a first UL sub-slot in the set of UL sub-slots, a determination is made as to whether the first UL sub-slot overlaps a first DL slot. In this case, while the first DL slot overlaps the first UL sub-slot, a determination is made as to whether a predetermined overlapping condition between the first UL sub-slot and the first DL slot is met. In aspects, the predetermined overlapping condition between the first UL sub-slot and the first DL slot includes whether the first UL sub-slot is the last UL sub-slot (e.g., the UL sub-slot with the highest index) in the set of UL sub-slots that overlaps with the first DL slot. Alternatively, the predetermined overlapping condition between the first UL sub-slot and the first DL slot includes whether the first UL sub-slot is the last UL sub-slot in the set of UL sub-slots that ends within the first DL slot. In aspects, the same procedure is used to determine whether any of the UL sub-slots in the set of UL sub-slots satisfies the overlapping condition with any of the DL slots overlapping any of the UL sub-slots in the set of UL sub-slots.

In aspects, when the predetermined overlapping condition between the first UL sub-slot and the first DL slot is determined to be met, the UE performs a procedure for determining a set of candidate PDSCH reception occasions in the first DL slot, where the procedure includes removing TDRA candidates from the set of TDRA candidates with which the first DL slot is configured when the TDRA candidates end in a symbol that does not fall within any (or falls outside all) of the UL sub-slots in the set of UL sub-slots. In some aspects, the set of TDRA candidates of the first DL slot is further trimmed by removing TDRA candidates that overlap with a semi-static UL symbol, and removing TDRA candidates that overlap with other TDRA candidates within the first DL slot (e.g., legacy TDRA pruning). The remaining set of TDRA candidates is used to generate the set of candidate PDSCH reception occasions in the first DL slot. In aspects, the set of candidate PDSCH reception occasions in the first DL slot is added to the set of candidate PDSCH reception occasions in other DL slots that overlaps with UL sub-slots in the set of UL sub-slots to generate the set of candidate PDSCH reception occasions from which the HARQ feedback CB s to be generated.

In aspects, the UE generates or construct the HARQ feedback CB based on the overall set of PDSCH reception occasions. In some aspects, the HARQ feedback CB includes one or more HARQ feedback bit for each candidate PDSCH reception occasion in the set of candidate PDSCH reception occasions, as described above. As will be appreciated, generating the HARQ feedback CB based on the overall set of PDSCH reception occasions provides a HARQ feedback CB technique that addresses the problems with current approaches for HARQ feedback codebook generation (e.g., UL/DL lengths not a multiple of each other, a UE not allowed to transmit HARQ feedback in every slot due to condition check, large redundancy due to UL/DL misalignment, etc.), as it considers whether the overlapping condition is present when determining on which DL slots and/or UL sub-slots the procedure for determining a set of candidate PDSCH reception occasions is to be performed, even if there is a UL/DL slot misalignment, partial overlap, or a condition check, on the DL/UL slots.

Figure 6:
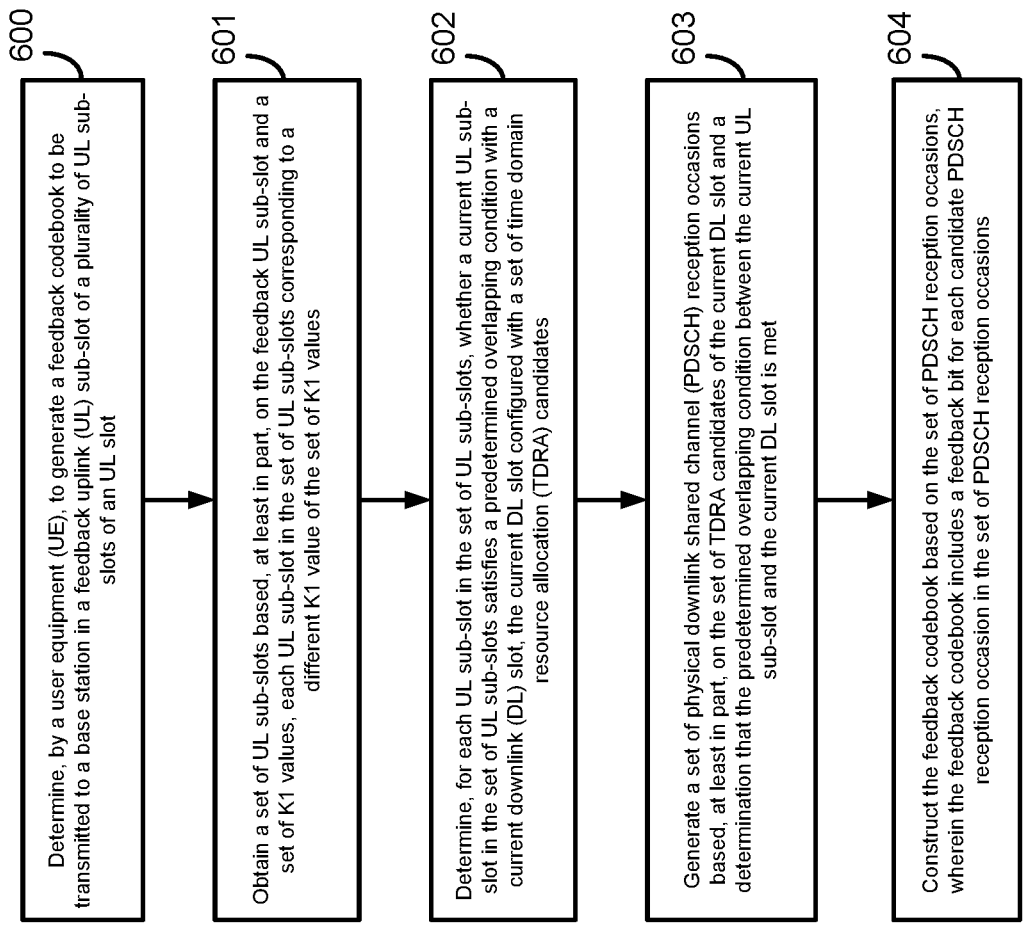
FIG. 6 is a block diagram illustrating example blocks executed to implement one aspect of the present disclosure.
Figure 8:
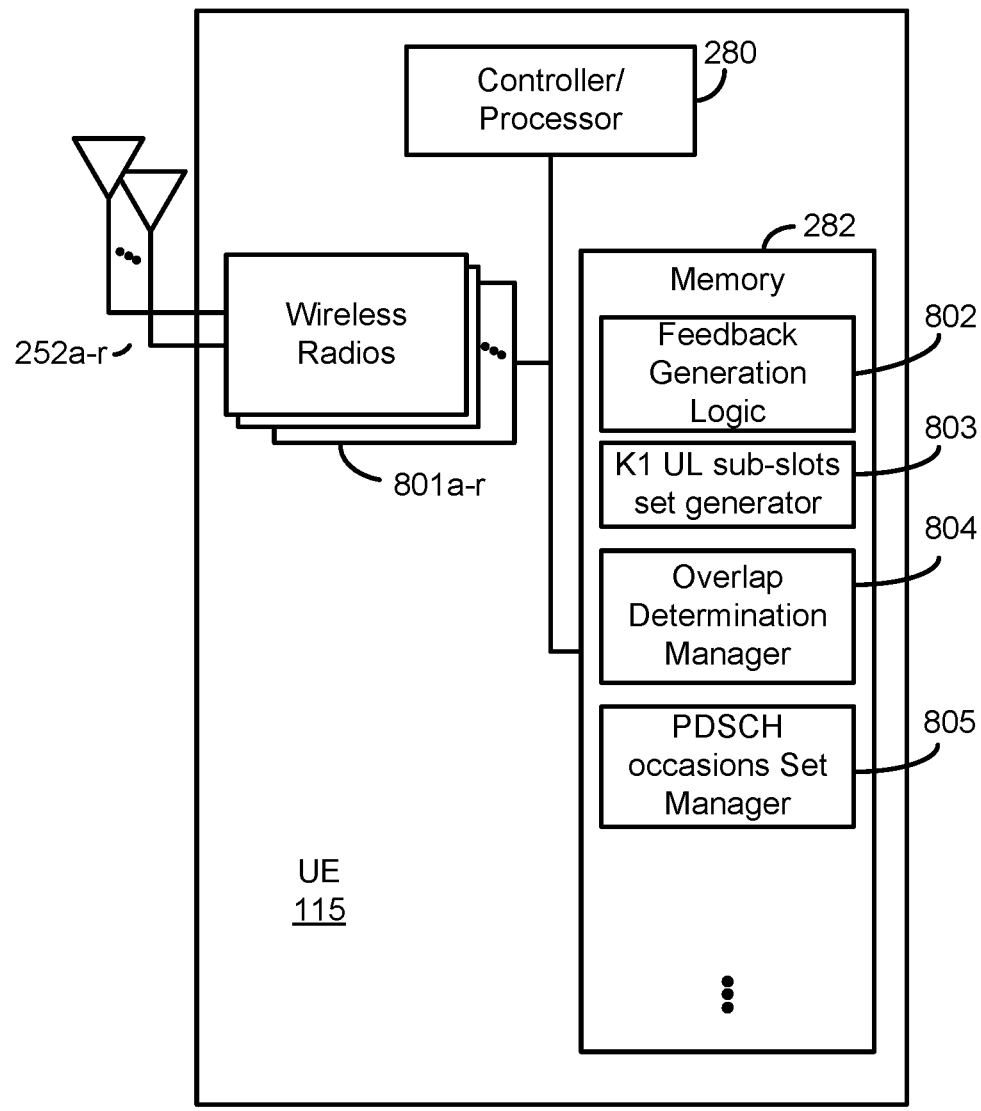
FIG. 8 is a block diagram of an example UE that supports sub-slot based Type-1 HARQ feedback CB generation according to one or more aspects.

FIG. 6 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2 for UE 115, including modulator/demodulators 254a-r, MIMO detector 256, receive processor 258, transmit processor 264, and TX MIMO processor 266.

Figure 7A:
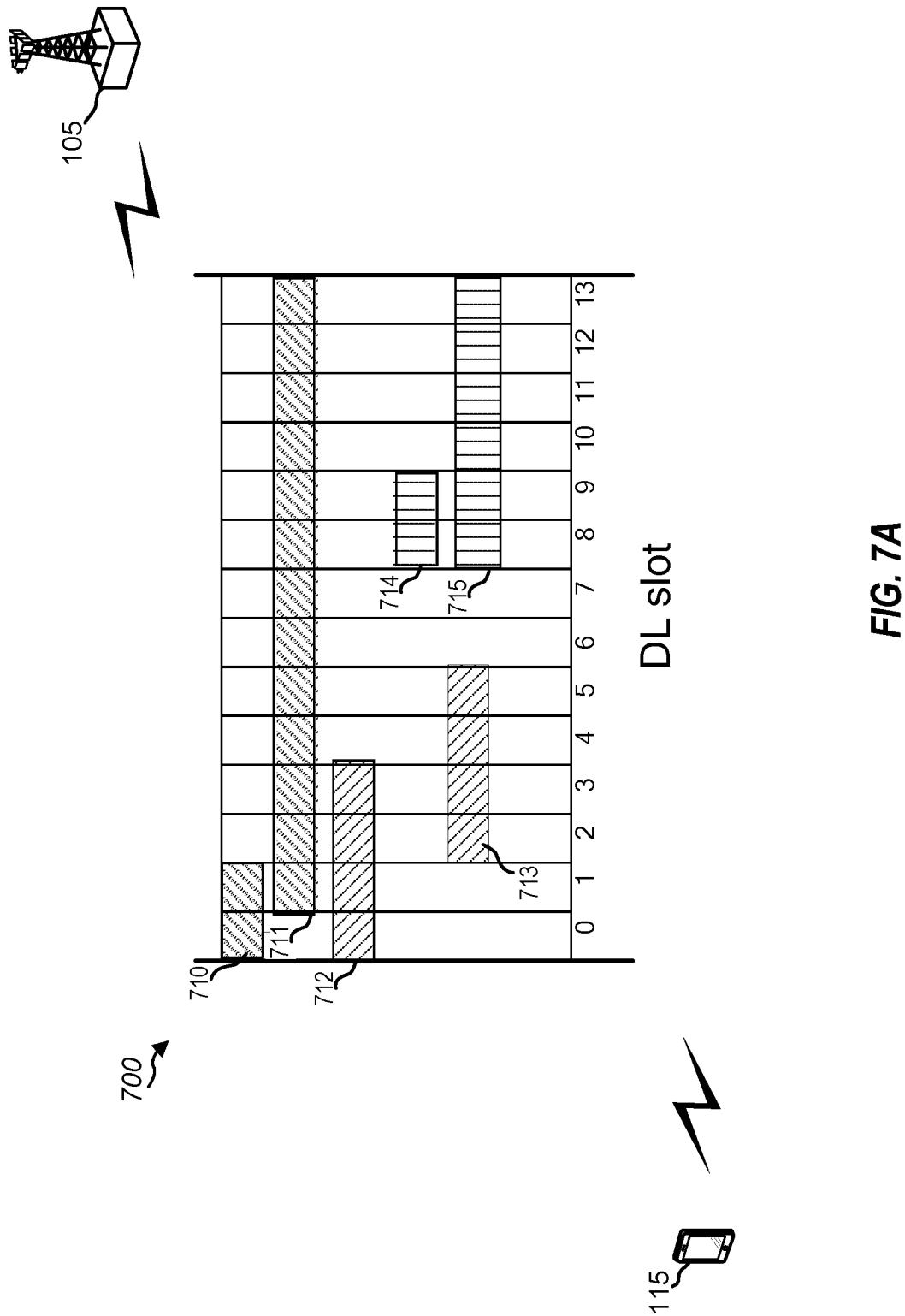
FIG. 7A is a diagram illustrating an example of a DL slot configuration including time domain resource allocation (TDRA) candidates in accordance aspects of the present disclosure.
Figure 7B:
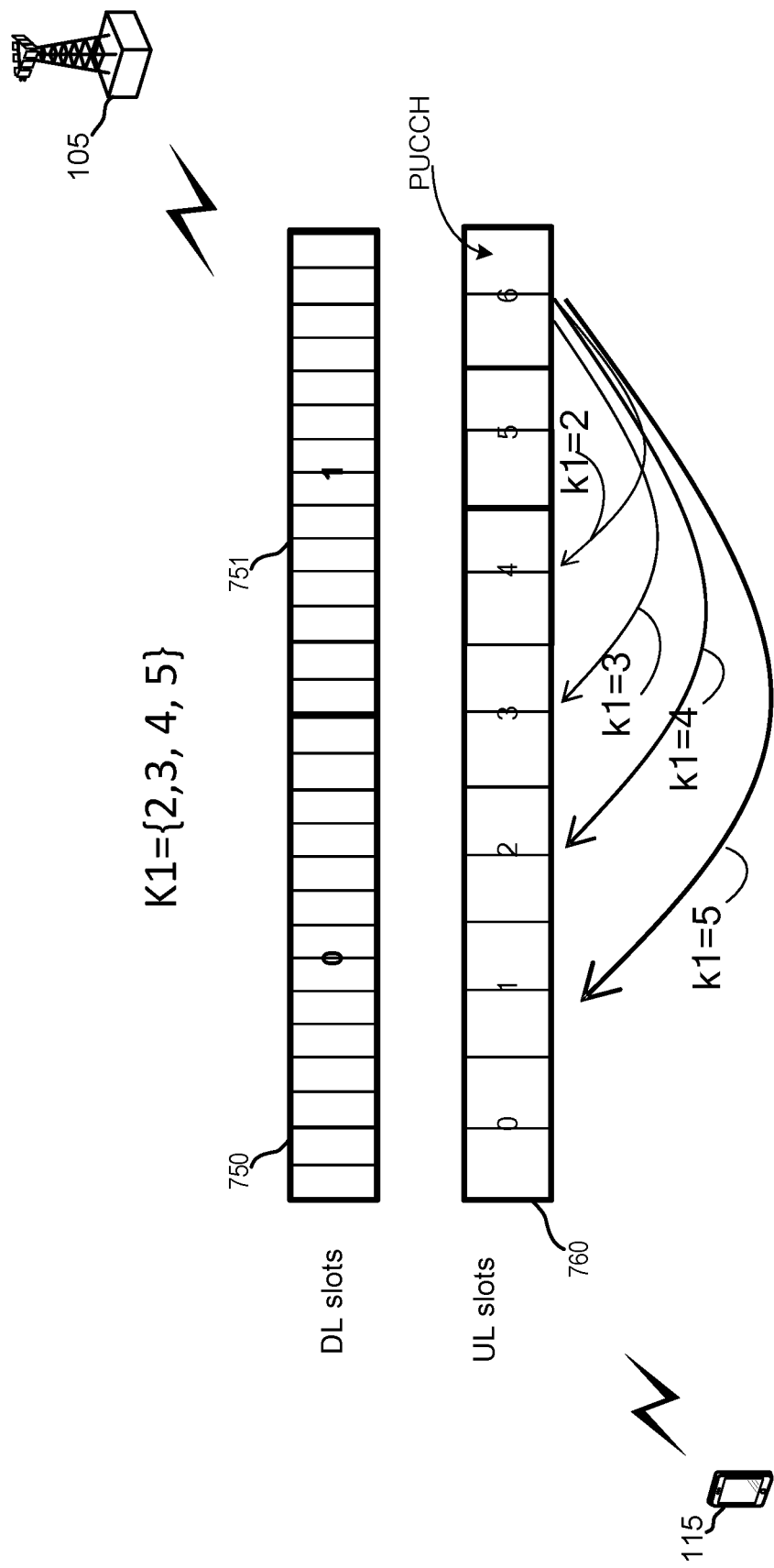
FIG. 7B is a diagram illustrating an example of a sub-slot based Type-1 HARQ feedback CB generation in accordance with aspects of the present disclosure.

In addition, the example blocks will also be described with respect to the diagram illustrated in FIG. 7A and the diagram illustrated in FIG. 7B. FIG. 7A is a diagram illustrating an example of a DL slot configuration including TDRA candidates in accordance aspects of the present disclosure. In particular, FIG. 7A shows DL slot configuration 700, which specifies a number of TDRA candidates in which base station 105 may schedule PDSCH transmission to UE 115. In aspects, the set of TDRA candidates may be determined by UE 115 based on prior configuration of UE 115 or may be indicated by base station 105 to UE 115. In the particular example illustrated in FIG. 7A, DL slot configuration 700 may specify six TDRAs 710-715 with which a DL slot for UE 115 may be configured. As seen, the DL slot may include 14 symbols. In this example, TDRA candidate 710 may occupy the first two symbols, TDRA candidate 711 may occupy symbols 1-13, TDRA candidate 712 may occupy symbols 0-3, TDRA candidate 713 may occupy symbols 2-5, TDRA candidate 714 may occupy symbols 8 and 9, and TDRA candidate 715 may occupy symbols 8-13.

FIG. 7B is a diagram illustrating an example of a sub-slot based Type-1 HARQ feedback codebook generation in accordance with aspects of the present disclosure. In particular, FIG. 7B shows a configuration for UE 115 in which UL slot 760 may include 14 symbols, and may be configured with an SCS=15 KHz and a sub-slot length=2 symbols. In this example, UL slot 760 may include seven sub-slots 0-6. In this example, DL slots 750 and 751 (also referred to herein as slot 0 and slot 1, respectively) may each be configured to include 14 symbols, but may be configured with an SCS=30 KHz, in which case, each UL symbol of UL slot 760 overlaps two DL symbols of DL slots 750 and 751 (e.g., the duration of one UL symbol is equal to the aggregated duration of two DL symbols). In this example, UL slot 760 may overlap both downlink slots 750 and 751. In this example, UE 115 may be configured with a set of K1={2, 3, 4, 5}.

At block 600, a UE (e.g., UE 115) determines to generate a feedback CB (e.g., a HARQ feedback CB) to be transmitted to a base station (e.g., base station 105) in an UL sub-slot of a plurality of UL sub-slots of an UL slot. In order to implement the functionality for such operations, UE 115, under control of controller/processor 280, executes feedback generation logic 802, stored in memory 282. The functionality implemented through the execution environment of feedback generation logic 802 allows for UE 115 to perform feedback CB generation operations according to the various aspects herein. For example, UE 115 may determine to transmit a HARQ feedback CB in UL sub-slot 6 of UL slot 760.

At block 601, UE 115 obtains a set of UL sub-slots based, at least in part, on the UL sub-slot in which the HARQ feedback CB is to be transmitted and a set of K1 values. In order to implement the functionality for such operations, UE 115, under control of controller/processor 280, executes K1 UL sub-slots set generator 803, stored in memory 282. The functionality implemented through the execution environment of K1 UL sub-slots set generator 803 allows for UE 115 to perform operations for obtaining and/or generating the set of UL sub-slots based, at least in part, on the UL sub-slot in which the HARQ feedback CB is to be transmitted and the set of K1 values according to the various aspects herein. In aspects, each of the UL sub-slots in the set of UL sub-slots may be determined by a corresponding K1 value of the set of K1 values, with respect to the UL sub-slot in which the HARQ feedback CB is to be transmitted. For example, for the set of K1={2, 3, 4, 5}, UE 115 may determine a set of UL sub-slots that may include UL sub-slot 4 (corresponding to k1=2 based on sub-slot 6−2=sub-slot 4), UL sub-slot 3 (corresponding to k1=3 based on sub-slot 6−3=sub-slot 3), UL sub-slot 2 (corresponding to k1=4 based on sub-slot 6−4=sub-slot 2), UL sub-slot 1 (corresponding to k1=5 based on sub-slot 6−1=sub-slot 1). In this example, the set of UL sub-slots may include {UL sub-slot 1, UL sub-slot 2, UL sub-slot 3, UL sub-slot 4}.

At block 602, UE 115 determines, for each UL sub-slot in the set of UL sub-slots, whether a current UL sub-slot in the set of UL sub-slots satisfies a predetermined overlapping condition with a current DL slot. It is noted that as used herein, a current DL slot and/or a current UL sub-slot may refer to a current DL slot and/or a current UL sub-slot in terms of the iterative loop. As such, a current DL slot and/or a current UL sub-slot may refer to a DL slot and/or an UL sub-slot that is currently being processed in the iterative process or loop. Similarly, a next DL slot and/or a next UL sub-slot may refer to a DL slot and/or a UL sub-slot that is to be processed next, such as in the next iteration, in the iterative process or loop. In order to implement the functionality for such operations, UE 115, under control of controller/processor 280, executes overlap determination manager 804, stored in memory 282. The functionality implemented through the execution environment of overlap determination manager 804 allows for UE 115 to perform operations for determining whether a current UL sub-slot in the set of UL sub-slots satisfies a predetermined overlapping condition with a current DL slot according to the various aspects herein. In aspects, the current UL sub-slot may be associated with one of the k1 values in the set K1, and UE 115 may loop through all of the k1 values in the set K1 values in a descending or ascending order. In aspects, the current DL slot configured with a set of time domain resource allocation (TDRA) candidates. In aspects, determining whether the current UL sub-slot satisfies the predetermined overlapping condition with the current DL slot includes determining whether the current UL sub-slot in the set of UL sub-slots overlaps with the current DL slot. In this manner, the determination of whether a current UL sub-slot overlaps with a current DL slot may be part of a loop associated with all the configured k1 values of set K1. For example, UE 115 may loop through the k1 values in K1={2, 3, 4, 5} in descending or ascending order, beginning with k1=5, which may correspond to UL sub-slot 1, and may determine whether a current DL slot (e.g., DL slot 0) overlaps with UL sub-slot 1. In particular, it is noted that aspects of the present disclosure also provide functionality to loop through DL slots that overlap any of the UL sub-slots of the set of UL sub-slots in the process for determining a set of PDSCH reception candidates for which the HARQ feedback CB is to be generated. For example, aspects provide functionality to loop (e.g., the outer while loop in the pseudo-code illustrated in Table 1) through each UL sub-slot. Then, through another loop (e.g., the inner while loop in the pseudo-code illustrated in Table 1) a current UL sub-slot may be fixed and the process loops through DL slots that may overlap with the current UL sub-slot (e.g., instead of the DL slots that overlap with any UL sub-slot in the set of UL sub-slots). In aspects, the other DL slots may be considered once the outer while loop moves to another UL sub-slot that overlaps with these other DL slots.

In aspects, determining whether the current UL sub-slot satisfies the predetermined overlapping condition with the current DL slot may include UE 115 determining whether the current UL sub-slot in the set of UL sub-slots satisfies the predetermined overlapping condition with the current DL slot while the current UL sub-slot in the set of UL sub-slots overlaps with the current DL slot. For example, UE 115 may determine, while DL slot 0 overlaps with UL sub-slot 1, whether UL sub-slot 1 satisfies the predetermined overlapping condition with DL slot 0. In aspects, the predetermined overlapping condition between DL slot 0 and UL sub-slot 1 may include whether UL sub-slot 1 is the last UL sub-slot in the set of UL sub-slots that overlaps with DL slot 0. Alternatively, the predetermined overlapping condition between the DL slot 0 and UL sub-slot 1 may include whether UL sub-slot 1 is the last UL sub-slot in the set of UL sub-slots that ends within the duration of DL slot 0. In this case, UL sub-slot 1 is not the last UL sub-slot in the set of UL sub-slots {UL sub-slot 1, UL sub-slot 2, UL sub-slot 3, UL sub-slot 4} that overlaps DL slot 0, as UL sub-slot 2 and UL sub-slot 3 both overlap DL slot 0 and occur later in the set of UL sub-slots. Alternatively, UL sub-slot 1 is not the last UL sub-slot in the set of UL sub-slots that ends within DL slot 0, as UL sub-slot 2 also ends within DL slot 0 and occurs later in the set of UL sub-slots. Therefore, in this example, UL sub-slot 1 does not satisfy the predetermined overlapping condition with DL slot 0.

In aspects, as UL sub-slot 1 does not satisfy the predetermined overlapping condition with DL slot 0, UE 115 may not consider UL sub-slot 1 (e.g., may skip UL sub-slot 1) for performing a TDRA determination (e.g., generating a set of candidate PDSCH reception occasions) for the associated DL slot (e.g., DL slot 0) based on UL sub-slot 1. In this case, UE 115 may increment the DL slot index, which may proceed to the next DL slot, e.g., DL slot 1. In aspects, UE 115 may determine whether DL slot 1 and UL sub-slot 1 overlap. As DL slot 1 and UL sub-slot 1 do not overlap, UE 115 may reset the DL slot counter (back to DL slot 0) and may increment the UL sub-slot counter to proceed to the next k1 value in the K1 set (e.g., k1=4) in descending or ascending order. In this case, the next UL sub-slot corresponding to k1=4 may be UL sub-slot 2.

In aspects, UE 115 may apply the same procedure as described above to UL sub-slot 2. In these aspects, UE 115 may determine, while DL slot 0 overlaps with UL sub-slot 2, whether UL sub-slot 2 satisfies the predetermined overlapping condition with DL slot 0. In this case, UL sub-slot 2 is not the last UL sub-slot in the set of UL sub-slots that overlaps DL slot 0, as UL sub-slot 3 overlaps DL slot 0 and occurs later in the set of UL sub-slots. Based on this condition, UL sub-slot 2 does not satisfy the predetermined overlapping condition with DL slot 0, and UE 115 may not consider UL sub-slot 2 (e.g., may skip UL sub-slot 2) for performing a TDRA determination (e.g., generating a set of candidate PDSCH reception occasions) for DL slot 0 based on UL sub-slot 2.

However, in alternative aspects as noted above, the predetermined overlapping condition may include determining whether UL sub-slot 2 is the last UL sub-slot in the set of UL sub-slots that ends within the duration of DL slot 0. In this example, UL sub-slot 2 is the last UL sub-slot in the set of UL sub-slots that ends within DL slot 0, as the next UL sub-slot (e.g., UL sub-slot 3) does not end within DL slot 0. In these aspects, and based on UL sub-slot 2 satisfying the predetermined overlapping condition with DL slot 0, UE 115 may perform a TDRA determination (e.g., to generate a set of candidate PDSCH reception occasions) for DL slot 0. Details of the procedure for generating a set of candidate PDSCH reception occasions for a DL slot will be discussed in more detail below.

In aspects, UE 115 may again increment the DL slot index, which may proceed to the next DL slot, e.g., DL slot 1, and may determine that DL slot 1 and UL sub-slot 2 do not overlap. UE 115 may reset the DL slot counter (back to DL slot 0) and may increment the UL sub-slot counter to proceed to the next k1 value in the K1 set (e.g., k1=3) in descending or ascending order. In this case, the next UL sub-slot corresponding to k1=3 may be UL sub-slot 3.

In aspects, UE 115 may apply the same procedure as described above to UL sub-slot 3. In particular, UE 115 may determine, while DL slot 0 overlaps with UL sub-slot 3, whether UL sub-slot 3 satisfies the predetermined overlapping condition with DL slot 0. In this case, UL sub-slot 3 is the last UL sub-slot in the set of UL sub-slots that overlaps DL slot 0. Based on this condition, UL sub-slot 3 satisfies the predetermined overlapping condition with DL slot 0, and UE 115 may consider UL sub-slot 3 (e.g., may not skip UL sub-slot 3) for performing a TDRA determination (e.g., generating a set of candidate PDSCH reception occasions) for DL slot 0 based on UL sub-slot 3.

It is noted that, DL slot 0 may not be processed to generate a set of candidate PDSCH reception occasions based on UL sub-slots 1 and 2, when the first option for the predetermined overlapping condition (e.g., whether the UL sub-slot is the last UL sub-slot in the set of UL sub-slots overlapping with DL slot 0) is used, but DL slot 0 may be processed to generate a set of candidate PDSCH reception occasions based on UL sub-slots 3. On the other hand, DL slot 0 may not be processed to generate a set of candidate PDSCH reception occasions based on UL sub-slots 1 and 3, when the second option for the predetermined overlapping condition (e.g., whether the UL sub-slot is the last UL sub-slot in the set of UL sub-slots ending within DL slot 0) is used, but DL slot 0 may be processed to generate a set of candidate PDSCH reception occasions based on UL sub-slot 2.

In aspects, UE 115 may again increment the DL slot index, which may proceed to the next DL slot, e.g., DL slot 1, and may determine that DL slot 1 and UL sub-slot 3 do overlap. In this case, UE 115 may apply the same procedure as described above to UL sub-slot 3 with respect to DL slot 1. In particular, UE 115 may determine, while DL slot 1 overlaps with UL sub-slot 3, whether UL sub-slot 3 satisfies the predetermined overlapping condition with DL slot 1. In this case, UL sub-slot 3 is not the last UL sub-slot in the set of UL sub-slots that overlaps DL slot 1, as UL sub-slot 4 also overlaps with DL slot 1 and occurs later in the set of UL sub-slots. Based on this, UE 115 may determine that UL sub-slot 3 does not satisfy the predetermined overlapping condition with DL slot 1. Alternatively, UE 115 may determine that UL sub-slot 3 is not the last UL sub-slot in the set of UL sub-slots that ends within DL slot 1, as UL sub-slot 4 also ends within DL slot 1 and occurs later in the set of UL sub-slots. Therefore, under this alternative, UE 115 may determine that UL sub-slot 3 does not satisfy the predetermined overlapping condition with DL slot 1. Therefore, UE 115 may not consider UL sub-slot 3 (e.g., may skip UL sub-slot 3) for performing a TDRA determination (e.g., generating a set of candidate PDSCH reception occasions) for DL slot 1 based on UL sub-slot 3.

UE 115 may reset the DL slot counter (back to DL slot 0) and may increment the UL sub-slot counter to proceed to the next k1 value in the K1 set (e.g., k1=2) in descending or ascending order. In this case, the next UL sub-slot corresponding to k1=2 may be UL sub-slot 4.

In aspects, UE 115 may apply the same procedure as described above to UL sub-slot 4. In particular, UE 115 may determine, while DL slot 1 overlaps with UL sub-slot 4, whether UL sub-slot 4 satisfies the predetermined overlapping condition with DL slot 1. In this case, UL sub-slot 4 is the last UL sub-slot in the set of UL sub-slots that overlaps DL slot 1. Based on this condition, UL sub-slot 4 satisfies the predetermined overlapping condition with DL slot 1, and UE 115 may consider UL sub-slot 4 (e.g., may not skip UL sub-slot 4) for performing a TDRA determination (e.g., generating a set of candidate PDSCH reception occasions) for DL slot 1 based on UL sub-slot 4.

Alternatively, the predetermined overlapping condition may include determining whether UL sub-slot 4 is the last UL sub-slot in the set of UL sub-slots that ends within the duration of DL slot 1. In this example, UL sub-slot 4 is the last UL sub-slot in the set of UL sub-slots that ends within DL slot 1. In these aspects, and based on UL sub-slot 4 satisfying the predetermined overlapping condition with DL slot 1, UE 115 may perform a TDRA determination (e.g., to generate a set of candidate PDSCH reception occasions) for DL slot 1. Details of the procedure for generating a set of candidate PDSCH reception occasions for a DL slot will be discussed in more detail below.

It is noted that, DL slot 1 may not be processed to generate a set of candidate PDSCH reception occasions based on UL sub-slot 3, when either the first option for the predetermined overlapping condition (e.g., whether the UL sub-slot is the last UL sub-slot in the set of UL sub-slots overlapping with DL slot 0) is used, or when the second option for the predetermined overlapping condition (e.g., whether the UL sub-slot is the last UL sub-slot in the set of UL sub-slots ending within DL slot 0) is used. However, when either option is used, DL slot 1 may be processed to generate a set of candidate PDSCH reception occasions based on UL sub-slot 4, as UL sub-slot 4 meets either condition.

At block 603, UE 115 generates a set of PDSCH reception occasions based, at least in part, on the set of TDRA candidates of the current DL slot and a determination that the current DL slot satisfies the predetermined overlapping condition with the current UL sub-slot, or that the current UL sub-slot satisfies the predetermined overlapping condition with the current DL slot. In order to implement the functionality for such operations, UE 115, under control of controller/processor 280, executes PDSCH occasions set manager 805, stored in memory 282. The functionality implemented through the execution environment of PDSCH occasions set manager 805 allows for UE 115 to perform operations for generating a set of PDSCH reception occasions based, at least in part, on the set of TDRA candidates of the current DL slot and a determination that the current DL slot satisfies the predetermined overlapping condition with the current UL sub-slot, or that the current UL sub-slot satisfies the predetermined overlapping condition with the current DL slot according to the various aspects herein.

At block 604 UE 115 constructs the HARQ feedback CB based on the set of PDSCH reception occasions. In aspects, constructing the HARQ feedback CB based on the set of PDSCH reception occasions includes including a feedback bit for each candidate PDSCH reception occasion in the set of PDSCH reception occasions in the HARQ feedback CB.

In aspects, the above procedure for generating a set of candidate PDSCH reception occasions, based, at least in part, on the set of TDRA candidates of the current DL slot and a determination that the current DL slot satisfies the predetermined overlapping condition with the current UL sub-slot, or that the current UL sub-slot satisfies the predetermined overlapping condition with the current DL slot, from which a HARQ feedback CB is generated may be implemented using the pseudo code illustrated in Table 1 below. It should be appreciated that the pseudo code is provided for illustrative purposes and should not be construed as limiting the present disclosure in any way. It should also be appreciated that the above described techniques may be implemented using different pseudo code and/or program code.

TABLE 1

Pseudo-code to construct a set of candidate PDSCH reception occasions for the active BWP of a DL serving cell in accordance with aspects of the present disclosure.

Let $n_U$ be the UL sub-slot index in which the HARQ feedback CB is to be transmitted.
Let $S = \{n_U - K_{1,k}: k = 0, \ldots, |K_1| - 1\}$ be the set of UL sub-slots determined by the set of RRC configured slot timing values $K_1$ - (S may also be referred to as HARQ feedback window (in UL sub-slots), and $K_1$ may be RRC configured (e.g., via dl-DataToUL-ACK).)
Set $k = 0$ - (index of slot timing values $\{K_{1,k}\}$ (in the unit of UL sub-slots), in descending or ascending order of the slot timing values, in set $K_1$ for serving cell c.)
While $k < |K_1|$—(loop over all configured values in $K_1$ (in unit of UL sub-slots) in descending or ascending order, represent cardinality)
    >Set $n_D = 0$—(index of a DL slot that overlaps with the UL sub-slot $n_U - K_{1,k}$)
    >While DL slot $n_D$ overlaps with UL sub-slot $n_U - K_{1,k}$
        >>if UL sub-slot $n_U - K_{1,k}$ is the last UL sub-slot in S that overlaps with DL slot $n_D$ (or alternatively if it the last UL sub-slot in S that ends in DL slot $n_D$), and
        >>if there is NO UL active BWP change or DL active BWP change between DL slot $n_D$ and UL sub-slot $n_U$
            >>>Perform candidate PDSCH reception occasions generation procedure to determine a set B of candidate PDSCH reception occasions in DL slot $n_D$.

TABLE 1-continued

Pseudo-code to construct a set of candidate PDSCH reception occasions for the active BWP of a DL serving cell in accordance with aspects of the present disclosure.

>>>$M_{A,C} = M_{A,C}$ uB, where $M_{A,C}^2$ is the set of candidate PDSCH reception occasions from which the HARQ feedback CB is to be generated
    >>End if
    >>$n_D = n_D + 1$
>End while
>$k = k + 1$
End while In aspects, as seen in the pseudo-code illustrated in Table 1, the predetermined overlapping condition may also include a determination as to whether, between an UL sub-slot $n_U$ and a DL slot $n_D$, there is one or more of a UL BWP change or a DL BWP change. In these cases, the UE may omit the corresponding DL slot $n_D$ for PDSCH reception occasion generation.

In aspects, generating the set of PDSCH reception occasions from which the HARQ feedback CB is generated may include multiplexing HARQ feedback bits for each PDSCH reception occasion in the set of candidate PDSCH reception occasions for each DL slot that was determined for TDRA determination based on the above described procedure. For example, DL slot 0 and DL slot 1 are both identified for TDRA determinations based on the predetermined overlapping condition being satisfied with at least one associated UL sub-slot in the set of UL sub-slots. In aspects, a set of candidate PDSCH reception occasions for DL slot 0 may be determined, and a set of candidate PDSCH reception occasions for DL slot 1 may also be determined. UE 115 may generate the set of PDSCH reception occasions from which the HARQ feedback CB is generated based on the set of candidate PDSCH reception occasions for DL slot 0 and the set of candidate PDSCH reception occasions for DL slot 1. In some aspects, UE 115 may generate a HARQ feedback bit for each candidate PDSCH reception occasion in the set of candidate PDSCH reception occasions.

In aspects, performing the TDRA determination for a DL slot may include applying a candidate PDSCH reception occasions generation procedure. In aspects, the candidate PDSCH reception occasions generation procedure for a particular slot may include, for each TDRA candidate r in the set R of RRC configured TDRA candidates in a DL slot, first removing all TDRA candidates r from set R that at least conflict with one semi-static UL symbol. For example, for DL slot 0 and DL slot 1 with DL slot configuration 700 (as shown in FIG. 7A), the set R may include TDRA candidates 710-715. In this example, it may be assumed that no TDRA candidate r in the set R conflicts with a semi-static UL symbol of UL slot 760 for either DL slot 0 and DL slot 1. As such, in this example, no TDRA candidate may be removed from the set R that includes TDRA candidates 710-715 for DL slot 0 or DL slot 1. Therefore, after the first step of the candidate PDSCH reception occasions generation procedure, the set of TDRA candidates for DL slot 0 includes TDRA candidates 710-715, and the set of TDRA candidates for DL slot 1 includes TDRA candidates 710-715.

Next in the candidate PDSCH reception occasions generation procedure, UE 115 may remove a TDRA candidate r in the set R when the TDRA candidate r ends in a symbol that falls outside of all, or does not fall in any of the, UL sub-slots in the set of UL sub-slots. For example, given the set of UL sub-slots {UL sub-slot 1, UL sub-slot 2, UL sub-slot 3, UL sub-slot 4} as determined above, and with respect to DL slot 0, UL sub-slot 1 overlaps with symbols 4-7 of DL slot 0. As seen in FIG. 7A, only TDRA 713 ends in a symbol that falls within UL sub-slot 1, namely symbol 5 of DL slot 0. In this same example, UL sub-slot 2 overlaps with symbols 8-11 of DL slot 0. As seen in FIG. 7A, only TDRA 714 ends in a symbol that falls within UL sub-slot 2, namely symbol 9 of DL slot 0. UL sub-slot 3 overlaps with symbols 12 and 13 of DL slot 0 (and also with symbols 0 and 1 of DL slot 1). As seen in FIG. 7A, TDRAs 711 and 715 end in a symbol that falls within UL sub-slot 3, namely symbol 13 of DL slot 0. In this case, with respect to DL slot 0, TDRAs 713, 714, 711, and 715 are kept in the set of TDRA candidates, but TDRAs 710 and 712 are removed. Therefore, after the second step of the candidate PDSCH reception occasions generation procedure, the set of TDRA candidates for DL slot 0 includes TDRA candidates 711 and 713-715.

With respect to slot 1, UL sub-slot 3 overlaps with symbols 0 and 1 of DL slot 1. As seen in FIG. 7A, only TDRA 710 ends in a symbol that falls within UL sub-slot 3, namely symbol 1 of DL slot 1. UL sub-slot 4 overlaps with symbols 2-5 of DL slot 1. As seen in FIG. 7A, TDRAs 712 and 713 end in a symbol that falls within UL sub-slot 4, namely symbols 3 and 5 of DL slot 1. In this case, with respect to DL slot 1, TDRAs 710, 712, and 713 are kept in the set of TDRA candidates, but TDRAs 711, 714, and 715 are removed. Therefore, after the second step of the candidate PDSCH reception occasions generation procedure, the set of TDRA candidates for DL slot 1 includes TDRA 710, 712, and 713.

Next in the candidate PDSCH reception occasions generation procedure, UE 115 may perform TDRA pruning, or TDRA grouping, as described above. In this step, UE 115 may determine a set of PDSCH reception occasions for DL slot 0 by applying TDRA pruning to TDRA candidates 711 and 713-715. Applying TDRA pruning to TDRA candidates 711 and 713-715 may generate two HARQ feedback bits, as at most there may be 2 non-overlapping PDSCH reception occasions between TDRA candidates 711 and 713-715. UE 115 may determine a set of PDSCH reception occasions for DL slot 1 by applying TDRA pruning to TDRA candidates 710, 712, and 713. Applying TDRA pruning to TDRA candidates 710, 712, and 713 may generate two HARQ feedback bits, as at most there may be 2 non-overlapping PDSCH reception occasions between TDRA candidates 710, 712, and 713.

Based on the above candidate PDSCH reception occasions generation procedure on DL slots 0 and 1, UE 115 may generate a HARQ feedback CB that includes four HARQ feedback bits (e.g., two HARQ feedback bits for DL slot 0 and two HARQ feedback bits for DL slot 1).

Figure 7C:
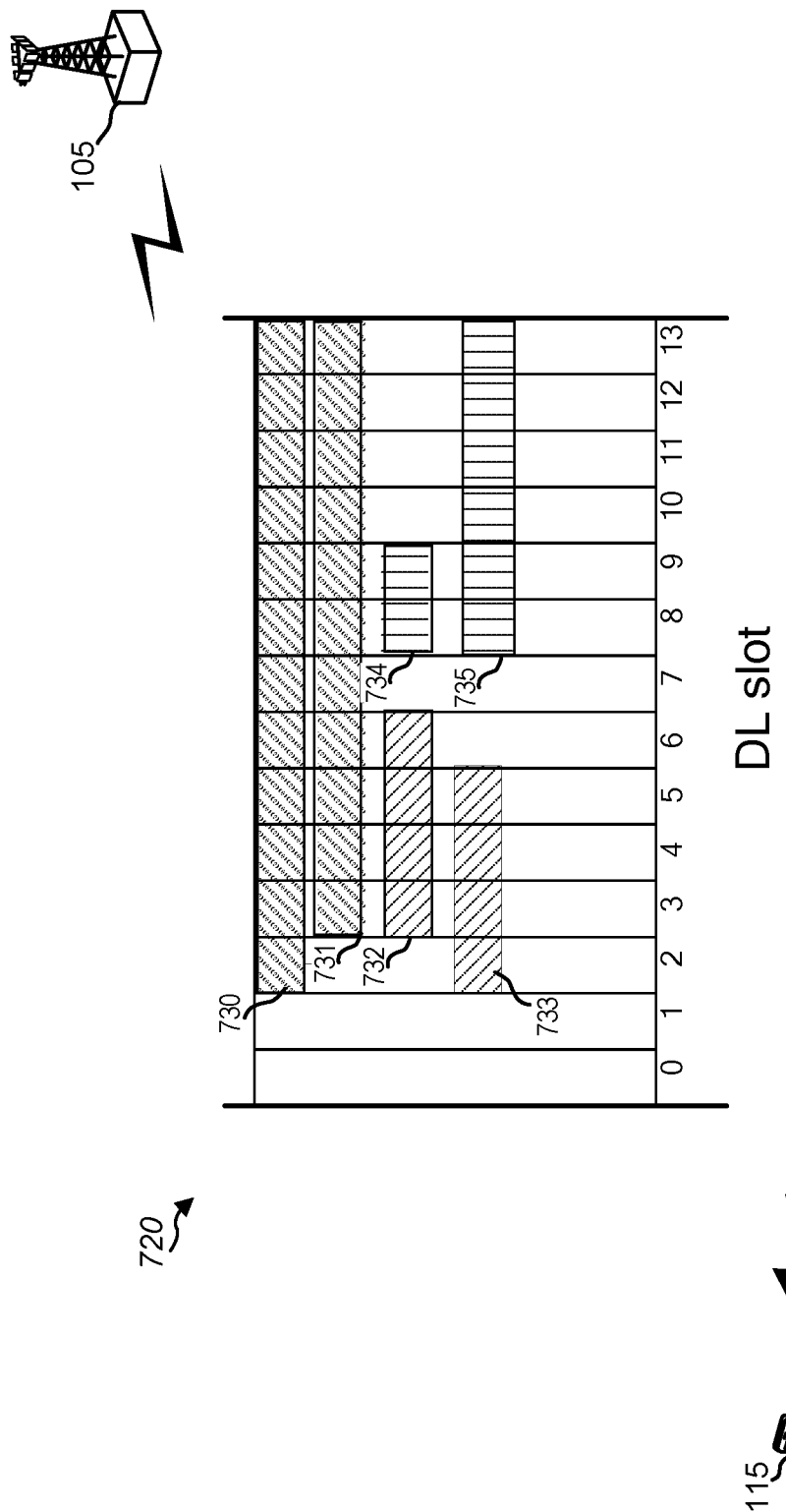
FIG. 7C is a diagram illustrating an example of a DL slot configuration including TDRA candidates in accordance with aspects of the present disclosure.
Figure 7D:
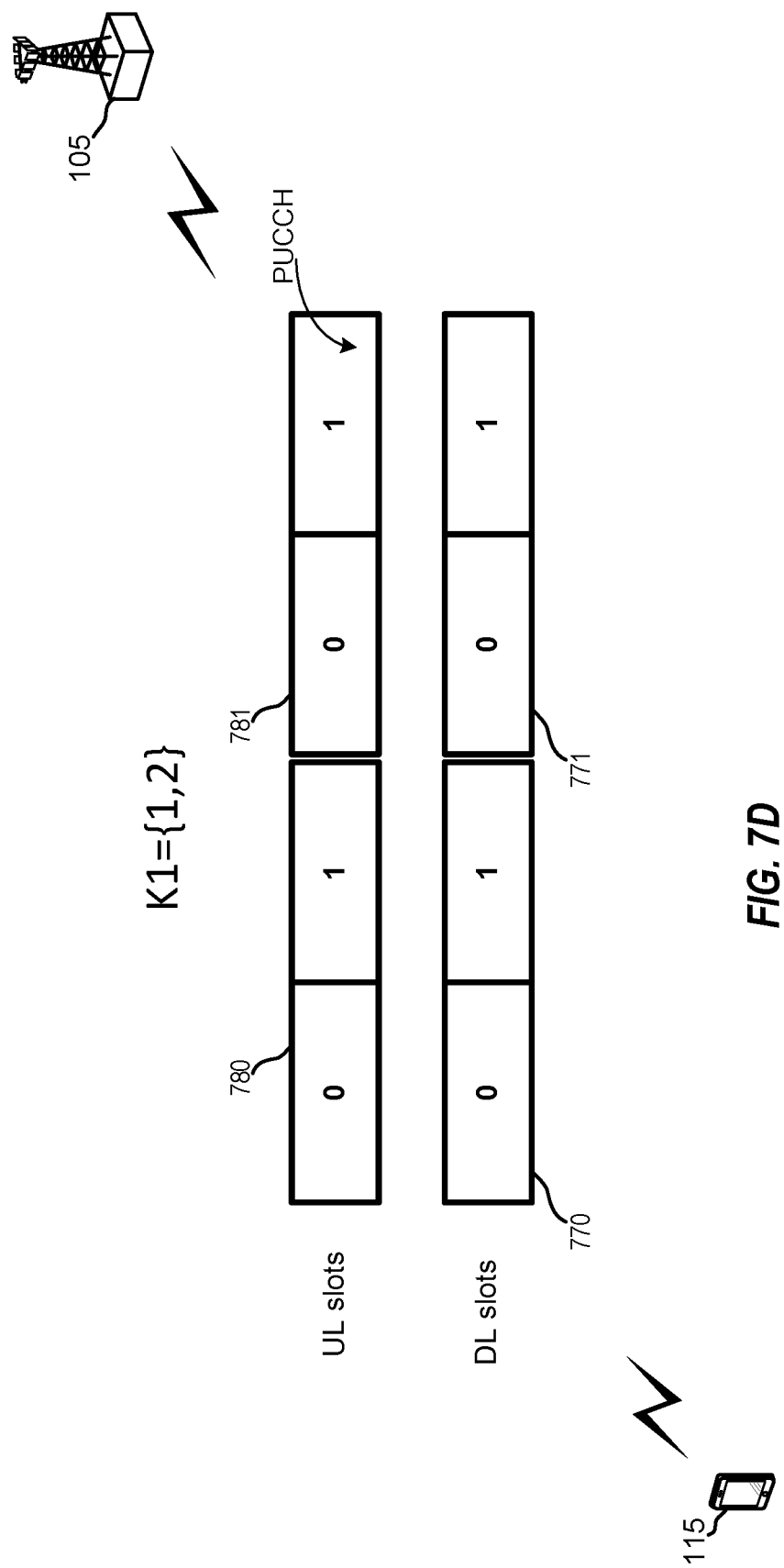
FIG. 7D is a diagram illustrating an example of a sub-slot based Type-1 HARQ feedback CB generation in accordance with aspects of the present disclosure.

FIGS. 7C and 7D are diagrams illustrating an example of a sub-slot based Type 1 HARQ feedback CB generation in accordance with aspects of the present disclosure. FIG. 7C is a diagram illustrating an example of a DL slot configuration including TDRA candidates in accordance aspects of the present disclosure. In particular, FIG. 7C shows DL slot configuration 720, which specifies six TDRA candidates 730-735 in which base station may schedule PDSCH transmission to UE 115. As shown, DL slot configuration 720 may include 14 symbols.

FIG. 7D is a diagram illustrating an example of a sub-slot based Type-1 HARQ feedback codebook generation in accordance with aspects of the present disclosure. In particular, FIG. 7D shows a configuration for UE 115 in which UL slots 780 and 781 may each include 14 symbols, and may be configured with an SCS=15 KHz and a sub-slot length=7 symbols. In this example, each of UL slot 780 and 781 may include two sub-slots 0 and 1. In this example, DL slots 770 and 771 may each be configured to include 14 symbols, but may be configured with an SCS=15 KHz, which is the same SCS as UL slots 780 and 781 (e.g., the duration of one UL symbol is equal to the duration of one DL symbol). In this example, one UL slot may overlap one DL slot. In this example, UE 115 may be configured with a set of K1={1, 2}.

In aspects, UE 115 may be configured to transmit a HARQ feedback CB in sub-slot 1 of UL slot 781. Applying the techniques disclosed herein may include determining a set S of UL sub-slots based on K1={1, 2}. This yields a set {UL sub-slot 0 of UL slot 781 associated with k1=1, UL sub-slot 1 of UL slot 780 associated with k1=2}. Iterating or looping through the set K1={1, 2} in descending or ascending order and through DL slots 780 and 781, for UL sub-slot 1 of UL slot 780, it may be determined that a predetermined overlapping condition as described above is met between UL sub-slot 1 of UL slot 780 and DL slot 770. In response, a candidate PDSCH reception occasions generation procedure may be applied to DL slot 770 as described above. Applying the candidate PDSCH reception occasions generation procedure, and assuming no DL symbols of DL slot 770 overlaps a semi-static symbol, may yield a set of TDRA candidates that include TDRAs 730, 731, 734, and 735, as these TDRAs end in a symbol within UL sub-slot 1 of UL slot 780. As there are no non-overlapping TDRAs in the set of TDRAs 730, 731, 734, and 735, at most one PDSCH reception occasion may be scheduled for this set and therefore one HARQ feedback bit is generated for DL slot 770. With respect to UL sub-slot 0 of UL slot 781 it may be determined that a predetermined overlapping condition as described above is met between UL sub-slot 0 of UL slot 781 and DL slot 771. In response, a candidate PDSCH reception occasions generation procedure may be applied to DL slot 771 as described above. Applying the candidate PDSCH reception occasions generation procedure, and assuming no DL symbols of DL slot 771 overlap a semi-static symbol, may yield a set of TDRA candidates that include TDRAs 732 and 733, as these TDRAs end in a symbol within UL sub-slot 0 of UL slot 781. As there are no non-overlapping TDRAs in the set of TDRAs 732 and 733, at most one PDSCH reception occasion may be scheduled for this set and therefore one HARQ feedback bit is generated for DL slot 771.

Based on the above candidate PDSCH reception occasions generation procedure on DL slots 770 and 771, UE 115 may generate a HARQ feedback CB that includes two HARQ feedback bits (e.g., one HARQ feedback bit for DL slot 770 and one HARQ feedback bit for DL slot 771) to be transmitted in sub-slot 1 of UL slot 781.

In one or more aspects, techniques for supporting sub-slot based Type-1 HARQ feedback codebook generation in a wireless communication system according to one or more aspects includes additional aspects, such as any single aspect or any combination of aspects described below or in connection with one or more other processes or devices described elsewhere herein. In a first aspect, supporting sub-slot based Type-1 HARQ feedback codebook generation in a wireless communication system includes an apparatus configured to determine to generate a feedback codebook to be transmitted to a base station in a feedback UL sub-slot of a plurality of UL sub-slots of an UL slot, to obtain a set of UL sub-slots based, at least in part, on the feedback UL sub-slot and a set of K1 values, each UL sub-slot in the set of UL sub-slots associated with a different K1 value of the set of K1 values, to determine, for each UL sub-slot in the set of UL sub-slots, whether a current UL sub-slot in the set of UL sub-slots satisfies a predetermined overlapping condition with a current DL slot, the current DL slot configured with a set of TDRA candidates, to generate a set of PDSCH reception occasions based, at least in part, on the set of TDRA candidates of the current DL slot and a determination that the current UL sub-slot satisfies the predetermined overlapping condition with the current DL slot, and to construct the feedback codebook based on the set of PDSCH reception occasions. Additionally, the apparatus performs or operate according to one or more aspects as described below. In some implementations, the apparatus includes a wireless device, such as a UE. In some implementations, the apparatus includes at least one processor, and a memory coupled to the processor. The processor is configured to perform operations described herein with respect to the apparatus. In some other implementations, the apparatus includes a non-transitory computer-readable medium having program code recorded thereon and the program code is executable by a computer for causing the computer to perform operations described herein with reference to the apparatus. In some implementations, the apparatus includes one or more means configured to perform operations described herein. In some implementations, a method of wireless communication includes one or more operations described herein with reference to the apparatus.

In a second aspect, alone or in combination with the first aspect, determining whether the current UL sub-slot satisfies the predetermined overlapping condition with the current DL slot includes determining whether the current UL sub-slot in the set of UL sub-slots overlaps with the current DL slot.

In a third aspect, alone or in combination with one or more of the first aspect or the second aspect, determining whether the current UL sub-slot satisfies the predetermined overlapping condition with the current DL slot includes determining whether the current UL sub-slot is the last UL sub-slot in the set of UL sub-slots that overlaps with the current DL slot.

In a fourth aspect, alone or in combination with one or more of the first aspect through the third aspect, determining whether the current UL sub-slot satisfies the predetermined overlapping condition with the current DL slot includes determining whether the current UL sub-slot is the last UL sub-slot in the set of UL sub-slots that ends within the current DL slot.

In a fifth aspect, alone or in combination with one or more of the first aspect through the fourth aspect, determining, for each UL sub-slot in the set of UL sub-slots, whether the current UL sub-slot in the set of UL sub-slots satisfies a predetermined overlapping condition includes determining, for each UL sub-slot in a descending order in the set of UL sub-slots, whether the current UL sub-slot in the set of UL sub-slots satisfies a predetermined overlapping condition.

In a sixth aspect, alone or in combination with one or more of the first aspect through the fifth aspect, wherein the feedback codebook includes one or more feedback bits for each candidate PDSCH reception occasion in the set of PDSCH reception occasions.

In a seventh aspect, alone or in combination with one or more of the first aspect through the sixth aspect, generating the set of PDSCH reception occasions includes applying, in response to the determination that the current UL sub-slot satisfies the predetermined overlapping condition with the current DL slot, a candidate PDSCH reception occasions generation procedure.

In an eighth aspect, alone or in combination with the seventh aspect, the candidate PDSCH reception occasions generation procedure includes removing a TDRA candidate from the set of TDRA candidates of the current DL slot when the TDRA candidate ends in a symbol that falls outside of all UL sub-slots in the set of UL sub-slots to generate a trimmed set of TDRA candidates.

In a ninth aspect, alone or in combination with one or more of the seventh aspect through the eighth aspect, the candidate PDSCH reception occasions generation procedure includes generating the set of PDSCH reception occasions based, at least in part, on the trimmed set of TDRA candidates.

In a tenth aspect, alone or in combination with the seventh aspect, the candidate PDSCH reception occasions generation procedure includes removing a TDRA candidate from the set of TDRA candidates of the current DL slot when the TDRA candidate within the current DL slot conflicts with at least one semi-static UL symbol in at least one UL sub-slot of the plurality of UL sub-slots.

In an eleventh aspect, alone or in combination with the seventh aspect, the candidate PDSCH reception occasions generation procedure includes removing a TDRA candidate from the set of TDRA candidates of the current DL slot when the TDRA candidate overlaps with another TDRA candidate within the current DL slot.

In a twelfth aspect, alone or in combination with one or more of the first aspect through the eleventh aspect, the techniques of the first aspect include determining, whether a next UL sub-slot in the set of UL sub-slots satisfies the predetermined overlapping condition with the current DL slot, the next UL sub-slot associated with a K1 value that is less than a K1 value associated with the current UL sub-slot.

In a thirteenth aspect, alone or in combination with the twelfth aspect, when the next UL sub-slot satisfies the predetermined overlapping condition with the current DL slot, the current UL sub-slot does not satisfy the predetermined overlapping condition with the current DL slot.

In a fourteenth aspect, alone or in combination with one or more of the twelfth aspect through the thirteenth aspect, the techniques of the first aspect include generating the set of PDSCH reception occasions based, at least in part, on the set of TDRA candidates of the current DL slot when the next UL sub-slot satisfies the predetermined overlapping with the current DL slot.

In a fifteenth aspect, alone or in combination with one or more of the first aspect through the fourteenth aspect, the techniques of the first aspect include determining whether the current UL sub-slot in the set of UL sub-slots satisfies the predetermined overlapping condition with a next DL slot, the next DL slot having an index higher than the current DL slot.

In a sixteenth aspect, alone or in combination with the fifteenth aspect, the techniques of the first aspect include generating the set of PDSCH reception occasions based, at least in part, on a set of TDRA candidates configured for the next DL slot (e.g., a set of TDRA candidates for the next DL slot configured and/pr indicated to the UE), the set of TDRA candidates of the current DL slot, and a determination that the current UL sub-slot satisfies the predetermined overlapping condition with the next DL slot.

In a seventeenth aspect, alone or in combination with one or more of the first aspect through the sixteenth aspect, the techniques of the first aspect include determining whether a next UL sub-slot in the set of UL sub-slots satisfies the predetermined overlapping condition with a next DL slot, the next UL sub-slot associated with a K1 value that is less than a K1 value associated with the current UL sub-slot, the next DL slot having an index higher than the current DL slot.

In an eighteenth aspect, alone or in combination with the seventeenth aspect, when the next UL sub-slot satisfies the predetermined overlapping condition with the next DL slot, the current UL sub-slot does not satisfy the predetermined overlapping condition with the next DL slot.

In a nineteenth aspect, alone or in combination with one or more of the seventeenth aspect through the eighteenth aspect, the techniques of the first aspect include generating the set of PDSCH reception occasions based, at least in part, on a set of TDRA candidates of the next DL slot, the set of TDRA candidates of the current DL slot, and a determination that the next UL sub-slot satisfies the predetermined overlapping condition with the next DL slot.

In a twentieth aspect, alone or in combination with one or more of the first aspect through the nineteenth aspect, the duration of the UL slot is different than the duration of the current DL slot.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6 may comprise processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a user equipment (UE), to generate a feedback codebook to be transmitted to a network entity in a feedback uplink (UL) sub-slot of a plurality of UL sub-slots of an UL slot;
   obtaining a set of UL sub-slots based, at least in part, on the feedback UL sub-slot and a set of K1 values, each UL sub-slot in the set of UL sub-slots associated with a different K1 value of the set of K1 values;
   determining, for each UL sub-slot in the set of UL sub-slots, whether a current UL sub-slot in the set of UL sub-slots satisfies a predetermined overlapping condition with a current downlink (DL) slot, the current DL slot configured with a set of time domain resource allocation (TDRA) candidates;
   generating a set of physical downlink shared channel (PDSCH) reception occasions based, at least in part, on the set of TDRA candidates of the current DL slot when the current UL sub-slot satisfies the predetermined overlapping condition with the current DL slot; and
   constructing the feedback codebook based on the set of PDSCH reception occasions.

2. The method of claim 1, wherein determining whether the current UL sub-slot satisfies the predetermined overlapping condition with the current DL slot includes:
   determining whether the current UL sub-slot in the set of UL sub-slots overlaps with the current DL slot.

3. The method of claim 1, wherein the current UL sub-slot is one of multiple UL sub-slots that overlap with the current DL slot.

4. The method of claim 3, wherein determining whether the current UL sub-slot satisfies the predetermined overlapping condition with the current DL slot is based, at least in part, on a sequential ordering of the current UL sub-slot within the multiple UL sub-slots that overlap with the current DL slot.

5. The method of claim 1, wherein determining, for each UL sub-slot in the set of UL sub-slots, whether the current UL sub-slot in the set of UL sub-slots satisfies the predetermined overlapping condition includes determining, for each UL sub-slot in a descending order in the set of UL sub-slots, whether the current UL sub-slot in the set of UL sub-slots satisfies the predetermined overlapping condition.

6. The method of claim 1, wherein the feedback codebook includes one or more feedback bits for each PDSCH reception occasion in the set of PDSCH reception occasions.

7. The method of claim 1, wherein generating the set of PDSCH reception occasions includes:
   removing an end symbol outside UL sub-slots TDRA candidate from the set of TDRA candidates of the current DL slot when the end symbol outside UL sub-slots TDRA candidate ends in a symbol that falls outside any UL sub-slot in the set of UL sub-slots to generate a trimmed set of TDRA candidates; and
   generating the set of PDSCH reception occasions based, at least in part, on the trimmed set of TDRA candidates.

8. The method of claim 7, wherein generating the set of PDSCH reception occasions further includes one or more of:
   removing a current DL slot conflicts with semi-static UL symbol TDRA candidate from the set of TDRA candidates of the current DL slot when the current DL slot conflicts with semi-static UL symbol TDRA candidate within the current DL slot conflicts with at least one semi-static UL symbol in at least one UL sub-slot of the plurality of UL sub-slots; or
   removing an overlaps with another TDRA candidate TDRA candidate from the set of TDRA candidates of the current DL slot when the overlaps with another TDRA candidate TDRA candidate overlaps with another TDRA candidate within the current DL slot.

9. The method of claim 1, further comprising:
   determining, whether a next UL sub-slot in the set of UL sub-slots satisfies the predetermined overlapping condition with the current DL slot, wherein the next UL sub-slot is associated with a K1 value from the set of K1 values that is less than a K1 value from the set of K1 values associated with the current UL sub-slot, and wherein, when the next UL sub-slot satisfies the predetermined overlapping condition with the current DL slot, the current UL sub-slot does not satisfy the predetermined overlapping condition with the current DL slot; and
   generating the set of PDSCH reception occasions based, at least in part, on the set of TDRA candidates of the current DL slot when the next UL sub-slot satisfies the predetermined overlapping condition with the current DL slot.

10. The method of claim 1, further comprising:
    determining whether the current UL sub-slot in the set of UL sub-slots satisfies the predetermined overlapping condition with a next DL slot, the next DL slot having an index higher than the current DL slot; and
    generating the set of PDSCH reception occasions based, at least in part, on a set of TDRA candidates configured for the next DL slot, the set of TDRA candidates of the current DL slot, and a determination that the current UL sub-slot satisfies the predetermined overlapping condition with the next DL slot.

11. The method of claim 1, further comprising:
    determining whether a next UL sub-slot in the set of UL sub-slots satisfies the predetermined overlapping condition with a next DL slot, wherein the next UL sub-slot is associated with a K1 value that is less than a K1 value associated with the current UL sub-slot, and the next DL slot has an index higher than the current DL slot, and wherein, when the next UL sub-slot satisfies the predetermined overlapping condition with the next DL slot, the current UL sub-slot does not satisfy the predetermined overlapping condition with the next DL slot; and
    generating the set of PDSCH reception occasions based, at least in part, on a set of TDRA candidates configured for the next DL slot, the set of TDRA candidates of the current DL slot, and a determination that the next UL sub-slot satisfies the predetermined overlapping condition with the next DL slot.

12. The method of claim 1, wherein a duration of the UL slot is different than a duration of the current DL slot.

13. An apparatus for wireless communication, comprising:
    at least one processor; and a memory coupled with the at least one processor and storing processor-readable code that, when executed by the at least one processor, is configured to perform operations including:
   determining, by a user equipment (UE), to generate a feedback codebook to be transmitted to a network entity in a feedback uplink (UL) sub-slot of a plurality of UL sub-slots of an UL slot;
   obtaining a set of UL sub-slots based, at least in part, on the feedback UL sub-slot and a set of K1 values, each UL sub-slot in the set of UL sub-slots associated with a different K1 value of the set of K1 values;
   determining, for each UL sub-slot in the set of UL sub-slots, whether a current UL sub-slot in the set of UL sub-slots satisfies a predetermined overlapping condition with a current downlink (DL) slot, the current DL slot configured with a set of time domain resource allocation (TDRA) candidates;
   generating a set of physical downlink shared channel (PDSCH) reception occasions based, at least in part, on the set of TDRA candidates of the current DL slot when the current UL sub-slot satisfies the predetermined overlapping condition with the current DL slot; and
   constructing the feedback codebook based on the set of PDSCH reception occasions.

14. The apparatus of claim 13, wherein determining whether the current UL sub-slot satisfies the predetermined overlapping condition with the current DL slot includes:
   determining whether the current UL sub-slot in the set of UL sub-slots overlaps with the current DL slot.

15. The apparatus of claim 13, wherein the current UL sub-slot is one of multiple UL sub-slots that overlap with the current DL slot.

16. The apparatus of claim 15, wherein determining whether the current UL sub-slot satisfies the predetermined overlapping condition with the current DL slot is based, at least in part, on a sequential ordering of the current UL sub-slot within the multiple UL sub-slots that overlap with the current DL slot.

17. The apparatus of claim 13, wherein determining, for each UL sub-slot in the set of UL sub-slots, whether the current UL sub-slot in the set of UL sub-slots satisfies the predetermined overlapping condition includes determining, for each UL sub-slot in a descending order in the set of UL sub-slots, whether the current UL sub-slot in the set of UL sub-slots satisfies the predetermined overlapping condition.

18. The apparatus of claim 13, wherein the feedback codebook includes one or more feedback bits for each PDSCH reception occasion in the set of PDSCH reception occasions.

19. The apparatus of claim 13, wherein generating the set of PDSCH reception occasions includes:
   removing an end symbol outside UL sub-slots TDRA candidate from the set of TDRA candidates of the current DL slot when the end symbol outside UL sub-slots TDRA candidate ends in a symbol that falls outside any UL sub-slot in the set of UL sub-slots to generate a trimmed set of TDRA candidates; and
   generating the set of PDSCH reception occasions based, at least in part, on the trimmed set of TDRA candidates.

20. The apparatus of claim 19, wherein generating the set of PDSCH reception occasions further includes one or more of:
   removing a current DL slot conflicts with semi-static UL symbol TDRA candidate from the set of TDRA candidates of the current DL slot when the current DL slot conflicts with semi-static UL symbol TDRA candidate within the current DL slot conflicts with at least one semi-static UL symbol in at least one UL sub-slot of the plurality of UL sub-slots; or
   removing an overlaps with another TDRA candidate TDRA candidate from the set of TDRA candidates of the current DL slot when the overlaps with another TDRA candidate TDRA candidate overlaps with another TDRA candidate within the current DL slot.

21. The apparatus of claim 13, wherein the operations further comprise:
   determining, whether a next UL sub-slot in the set of UL sub-slots satisfies the predetermined overlapping condition with the current DL slot, wherein the next UL sub-slot is associated with a K1 value from the set of K1 values that is less than a K1 value from the set of K1 values associated with the current UL sub-slot, and wherein, when the next UL sub-slot satisfies the predetermined overlapping condition with the current DL slot, the current UL sub-slot does not satisfy the predetermined overlapping condition with the current DL slot; and
   generating the set of PDSCH reception occasions based, at least in part, on the set of TDRA candidates of the current DL slot when the next UL sub-slot satisfies the predetermined overlapping condition with the current DL slot.

22. The apparatus of claim 13, wherein the operations further comprise:
   determining whether the current UL sub-slot in the set of UL sub-slots satisfies the predetermined overlapping condition with a next DL slot, the next DL slot having an index higher than the current DL slot; and
   generating the set of PDSCH reception occasions based, at least in part, on a set of TDRA candidates configured for the next DL slot, the set of TDRA candidates of the current DL slot, and a determination that the current UL sub-slot satisfies the predetermined overlapping condition with the next DL slot.

23. The apparatus of claim 13, wherein the operations further comprise:
   determining whether a next UL sub-slot in the set of UL sub-slots satisfies the predetermined overlapping condition with a next DL slot, wherein the next UL sub-slot is associated with a K1 value that is less than a K1 value associated with the current UL sub-slot, and the next DL slot has an index higher than the current DL slot, and wherein, when the next UL sub-slot satisfies the predetermined overlapping condition with the next DL slot, the current UL sub-slot does not satisfy the predetermined overlapping condition with the next DL slot; and
   generating the set of PDSCH reception occasions based, at least in part, on a set of TDRA candidates configured for the next DL slot, the set of TDRA candidates of the current DL slot, and a determination that the next UL sub-slot satisfies the predetermined overlapping condition with the next DL slot.

24. The apparatus of claim 13, wherein a duration of the UL slot is different than a duration of the current DL slot.

25. A non-transitory computer-readable medium storing instructions that, when executed by a processor, cause the processor to perform operations comprising:
   determining, by a user equipment (UE), to generate a feedback codebook to be transmitted to a network entity in a feedback uplink (UL) sub-slot of a plurality of UL sub-slots of an UL slot;

obtaining a set of UL sub-slots based, at least in part, on the feedback UL sub-slot and a set of K1 values, each UL sub-slot in the set of UL sub-slots associated with a different K1 value of the set of K1 values;

determining, for each UL sub-slot in the set of UL sub-slots, whether a current UL sub-slot in the set of UL sub-slots satisfies a predetermined overlapping condition with a current downlink (DL) slot, the current DL slot configured with a set of time domain resource allocation (TDRA) candidates;

generating a set of physical downlink shared channel (PDSCH) reception occasions based, at least in part, on the set of TDRA candidates of the current DL slot when the current UL sub-slot satisfies the predetermined overlapping condition with the current DL slot; and constructing the feedback codebook based on the set of PDSCH reception occasions.

26. The non-transitory computer-readable medium of claim 25, wherein determining whether the current UL sub-slot satisfies the predetermined overlapping condition with the current DL slot includes:
determining whether the current UL sub-slot in the set of UL sub-slots overlaps with the current DL slot.

27. The non-transitory computer-readable medium of claim 25, wherein the current UL sub-slot is one of multiple UL sub-slots that overlap with the current DL slot.

28. The non-transitory computer-readable medium of claim 27, wherein determining whether the current UL sub-slot satisfies the predetermined overlapping condition with the current DL slot is based, at least in part, on a sequential ordering of the current UL sub-slot within the multiple UL sub-slots that overlap with the current DL slot.

29. The non-transitory computer-readable medium of claim 25, wherein determining, for each UL sub-slot in the set of UL sub-slots, whether the current UL sub-slot in the set of UL sub-slots satisfies the predetermined overlapping condition includes determining, for each UL sub-slot in a descending order in the set of UL sub-slots, whether the current UL sub-slot in the set of UL sub-slots satisfies the predetermined overlapping condition.

30. The non-transitory computer-readable medium of claim 25, wherein the feedback codebook includes one or more feedback bits for each PDSCH reception occasion in the set of PDSCH reception occasions.

31. The non-transitory computer-readable medium of claim 25, wherein generating the set of PDSCH reception occasions includes:
removing an end symbol outside UL sub-slots TDRA candidate from the set of TDRA candidates of the current DL slot when the end symbol outside UL sub-slots TDRA candidate ends in a symbol that falls outside any UL sub-slot in the set of UL sub-slots to generate a trimmed set of TDRA candidates; and
generating the set of PDSCH reception occasions based, at least in part, on the trimmed set of TDRA candidates.

32. The non-transitory computer-readable medium of claim 31, wherein generating the set of PDSCH reception occasions further includes one or more of:
removing a current DL slot conflicts with semi-static UL symbol TDRA candidate from the set of TDRA candidates of the current DL slot when the current DL slot conflicts with semi-static UL symbol TDRA candidate within the current DL slot conflicts with at least one semi-static UL symbol in at least one UL sub-slot of the plurality of UL sub-slots; or
removing an overlaps with another TDRA candidate TDRA candidate from the set of TDRA candidates of the current DL slot when the overlaps with another TDRA candidate TDRA candidate overlaps with another TDRA candidate within the current DL slot.

33. The non-transitory computer-readable medium of claim 25, wherein the operations further comprise:
determining, whether a next UL sub-slot in the set of UL sub-slots satisfies the predetermined overlapping condition with the current DL slot, wherein the next UL sub-slot is associated with a K1 value from the set of K1 values that is less than a K1 value from the set of K1 values associated with the current UL sub-slot, and wherein, when the next UL sub-slot satisfies the predetermined overlapping condition with the current DL slot, the current UL sub-slot does not satisfy the predetermined overlapping condition with the current DL slot; and
generating the set of PDSCH reception occasions based, at least in part, on the set of TDRA candidates of the current DL slot when the next UL sub-slot satisfies the predetermined overlapping condition with the current DL slot.

34. The non-transitory computer-readable medium of claim 25, wherein the operations further comprise:
determining whether the current UL sub-slot in the set of UL sub-slots satisfies the predetermined overlapping condition with a next DL slot, the next DL slot having an index higher than the current DL slot; and
generating the set of PDSCH reception occasions based, at least in part, on a set of TDRA candidates configured for the next DL slot, the set of TDRA candidates of the current DL slot, and a determination that the current UL sub-slot satisfies the predetermined overlapping condition with the next DL slot.

35. The non-transitory computer-readable medium of claim 25, wherein the operations further comprise:
determining whether a next UL sub-slot in the set of UL sub-slots satisfies the predetermined overlapping condition with a next DL slot, wherein the next UL sub-slot is associated with a K1 value that is less than a K1 value associated with the current UL sub-slot, and the next DL slot has an index higher than the current DL slot, and wherein, when the next UL sub-slot satisfies the predetermined overlapping condition with the next DL slot, the current UL sub-slot does not satisfy the predetermined overlapping condition with the next DL slot; and
generating the set of PDSCH reception occasions based, at least in part, on a set of TDRA candidates configured for the next DL slot, the set of TDRA candidates of the current DL slot, and a determination that the next UL sub-slot satisfies the predetermined overlapping condition with the next DL slot.

36. The non-transitory computer-readable medium of claim 25, wherein a duration of the UL slot is different than a duration of the current DL slot.

* * * * *